(12) United States Patent
Greyson et al.

(10) Patent No.: US 12,552,613 B2
(45) Date of Patent: Feb. 17, 2026

(54) CONVEYOR CONTROLLER WITH ROLLER DETECTION SYSTEM

(71) Applicant: Bastian Solutions, LLC, Indianapolis, IN (US)

(72) Inventors: Tiffany Lee Greyson, Boise, ID (US); Samuel J. Osterhout, Indianapolis, IN (US); Benjamin Perry Baker, Indianapolis, IN (US); Adrian Rothenbuhler, Meridian, ID (US); Anton B. Eckerle, Fishers, IN (US)

(73) Assignee: Bastian Solutions, LLC, Indianapolis, IN (US)

( * ) Notice: Subject to any disclaimer, the term of this patent is extended or adjusted under 35 U.S.C. 154(b) by 504 days.

(21) Appl. No.: 18/302,916

(22) Filed: Apr. 19, 2023

(65) Prior Publication Data
US 2023/0382651 A1 Nov. 30, 2023

Related U.S. Application Data

(63) Continuation of application No. PCT/US2021/071933, filed on Oct. 20, 2021.
(Continued)

(51) Int. Cl.
*B65G 43/00* (2006.01)
*B65G 13/02* (2006.01)
(Continued)

(52) U.S. Cl.
CPC .......... *B65G 43/00* (2013.01); *B65G 13/02* (2013.01); *B65G 13/06* (2013.01); *B65G 39/02* (2013.01); *B65G 43/08* (2013.01)

(58) Field of Classification Search
CPC ........ B65G 43/00; B65G 43/08; B65G 13/02; B65G 13/06; B65G 39/02
See application file for complete search history.

(56) References Cited

U.S. PATENT DOCUMENTS 6,883,660 B2   4/2005   Bigelow et al.
8,757,363 B2   6/2014   Combs et al.
(Continued)

OTHER PUBLICATIONS

PCT, Intl. App. No. PCT/US2021/071933 International Search Report (ISR), 4 pages, Feb. 16, 2022.
(Continued)

*Primary Examiner* — Thomas Randazzo
(74) *Attorney, Agent, or Firm* — Woodard, Emhardt, Henry, Reeves & Wagner, LLP

(57) ABSTRACT

A roller detection system has been developed in which a controller card is configured to automatically detect the type of motorized drive roller being used in the conveyor system. With this automatic detection capability, the controller card is able to automatically control the motorized drive roller without the need for manual reprogramming or reconfiguration. For instance, the controller card can detect whether the motorized drive roller is controlled through an analog or digital signal as well as the voltage required to control or power the motorized drive roller, and based on this roller type detection, the controller card is automatically configured to control the motorized drive roller. The system is further adapted to facilitate a sensor-less or photoeye-less zero pressure (ZP) conveyor system. The controller card is configured to support a secondary power source that allows the motorized drive roller settings during e-stop and other power loss conditions.

29 Claims, 15 Drawing Sheets

Related U.S. Application Data

(60) Provisional application No. 63/198,454, filed on Oct. 20, 2020.

(51) Int. Cl.
  *B65G 13/06*  (2006.01)
  *B65G 39/02*  (2006.01)
  *B65G 43/08*  (2006.01)

(56) References Cited

U.S. PATENT DOCUMENTS

| | | | |
|---|---|---|---|
| 9,004,263 B2 | 4/2015 | Hall et al. | |
| 2001/0024609 A1 | 9/2001 | White et al. | |
| 2002/0010527 A1* | 1/2002 | Wielebski | B65G 47/261 |
| | | | 700/230 |
| 2002/0084173 A1 | 7/2002 | Paquette | |
| 2004/0016626 A1* | 1/2004 | Helgerson | B65G 13/06 |
| | | | 198/781.05 |
| 2005/0192704 A1 | 9/2005 | Wielebski et al. | |
| 2007/0261941 A1 | 11/2007 | Pelak et al. | |
| 2012/0024669 A1* | 2/2012 | Danelski | B65G 13/02 |
| | | | 198/781.05 |
| 2012/0175223 A1 | 7/2012 | Breen et al. | |
| 2014/0343720 A1* | 11/2014 | Danelski | G05B 19/124 |
| | | | 700/225 |
| 2020/0255226 A1 | 8/2020 | Danelski | |
| 2020/0387142 A1 | 12/2020 | Henze | |
| 2022/0024693 A1* | 1/2022 | Hampe | B65G 43/10 |
| 2023/0345647 A1* | 10/2023 | Bhavaraju | H05K 5/0039 |

OTHER PUBLICATIONS

PCT, Intl. App. No. PCT/US2021/071933 Written Opinion (WO) of the International Searching Authority, 7 pages, Feb. 16, 2022.

* cited by examiner

CONVEYOR CONTROLLER WITH ROLLER DETECTION SYSTEM

CROSS REFERENCE TO RELATED APPLICATIONS

This application is a continuation of International Patent Application Number PCT/US2021/071933, filed Oct. 20, 2021, which is hereby incorporated by reference. International Patent Application Number PCT/US2021/071933, filed Oct. 20, 2021, claims the benefit of U.S. Patent Application No. 63/198,454, filed Oct. 20, 2020, which are hereby incorporated by reference.

BACKGROUND

Conveyors are used in a wide variety of environments such as in manufacturing and warehouse environments. Maintenance and upkeep of conveyor systems is always a concern. Some types of conveyors utilize a motorized drive roller (MDR) to power a zone of the conveyor. However, there are a number of different standards for motorized drive rollers which can make their replacement or any upgrades a laborious and time-consuming process.

Thus, there is a need for improvement in this field.

SUMMARY

A unique controller card has been developed for use in conveyor systems. The controller card includes support for both 24V and 48V rollers without any change in the settings and/or configuration of the card. Similarly, the controller card further supports both older style alternating current (AC) systems, where a solenoid engages or disengages the conveyor from an AC motor used to power the conveyor, and newer direct current (DC) systems without requiring additional modifications. Some general components of the controller card include a sideband communication system, a data analytic system, and a roller detection system.

Electronic control units (ECUs) or nodes in the form of controller cards control the operation of various zones or sections of conveyors as well as communicate information about the conveyors and items transported by the conveyors. During repair, maintenance, or upgrades, a motorized drive roller (MDR), which provides the mechanical power for moving items on the conveyor, may be replaced with a new one. However, not all motorized drive rollers are the same. Depending on the type, a motorized drive roller may require either an analog signal or a digital signal for communication and control purposes. Moreover, the voltages for powering the motorized drive roller can vary. For example, older types of motorized drive rollers are typically powered by 24 volts (V), but newer motorized drive rollers tend to require 48V.

Providing an improper control signal or power voltage may result in the conveyor not operating properly, or worse yet, may destroy the controller card and/or the motorized drive roller. Therefore, great care must be taken when replacing motorized drive rollers or their controllers. When a different type of motorized drive roller is installed (or different kind of control card), the maintenance worker must confirm the motorized drive roller is compatible with the controller card being used. Moreover, some replacements may require manual reprogramming of the controller card or a complete replacement of the controller card. Time is critical when a conveyor is down, and these checks and reprogramming activities can be both time consuming and costly.

A roller detection system has been developed in which the controller cards are configured to automatically detect the type of motorized drive roller being used in the conveyor system. With this automatic detection capability, the controller card is able to automatically control the motorized drive roller without the need for manual reprogramming or reconfiguration. For instance, the controller card can detect whether the motorized drive roller is controlled through an analog or digital signal as well as the voltage required to control or power the motorized drive roller, and based on this roller type detection, the controller card is automatically configured to control the motorized drive roller. It should be appreciated that this automatic roller detection capability can be helpful in a number of situations, especially for maintenance, repair, and/or system upgrades. A broken motorized drive roller can be readily swapped out with a new one without the need of reprogramming the controller card (and vice-versa). Moreover, older conveyors can be easily upgraded, either at one time or on an as needed basis, by replacing older motorized drive rollers that typically have lower power voltage ratings (e.g., 24V) with newer ones that require higher power voltages (e.g., 48V).

Once more, motorized drive rollers are typically controlled through analog or digital control signals. The control signal usually controls whether the motorized drive roller is stopped or rotating, and if rotating, the speed and direction of rotation (i.e., velocity). Digital control signals can be for instance used when multiple controller cards are networked together or with other systems like a programmable logic controller (PLC) or a warehouse management system (WMS). For example, controller cards can be connected together and with the motorized drive rollers through RJ45 type Ethernet cables or other types of connections. In other examples, the controller cards and motorized drive rollers can be operatively connected through wireless and/or wired type connections. Together, the cards form a controller area network (CAN) that includes a communication bus.

The controller card may perform this auto-detection of the type of motor drive roller in a number of manners. In general terms, the controller card detects the type of motorized drive roller by applying a control signal and/or electrical power indicative of the motorized drive roller type, and then monitoring a property or response of the motorized drive roller that would be indicative of the motorized drive roller responding appropriately to the control signal and/or applied power. For example, the controller card can send a digital signal from the appropriate digital output port instructing the motorized drive roller to move, and then, monitor to see if the motorized drive roller moved. Typically, but not always, the activities for this technique are sequenced to minimize harm to the motor, controller card, and/or other components of the system. For instance, a digital control signal may be sent to the motorized drive roller to see if there is a response before sending an analog signal. In another example, lower voltage power is applied to the motorized drive roller to see if there is a response from the motorized drive roller before applying higher voltages.

In one example for detecting whether the motorized drive roller requires an analog or digital control signal, the controller card first sends to the motorized drive roller a digital signal via the CAN. The controller card then monitors the roller for the corresponding response. If the roller responds as expected, then the controller card will continue to send commands digitally using the CAN. If the roller does not respond to the CAN signal, an analog signal is sent from an analog output of the controller card to the motorized drive roller, and the controller card again monitors the roller for the expected response. For instance, the controller card may adjust the voltage to the motorized drive roller by some predetermined amount or threshold thus causing the roller to move in a known fashion in order to determine the power voltage rating for the motorized drive roller. In one aspect, the supplied voltage is ramped up to no more than 5V in order to minimize the risk of damage. If the expected motion of the motorized drive roller is detected, the controller card will continue to send instructions and commands via the analog connection instead of the digital connection and the card is determined to be connected to an analog roller.

In one particular example, the control module sends a digital control signal across a CAN to the motorized drive roller via a CAN interface of the controller card. The digital control signal instructs the motorized drive roller to rotate, move, and/or otherwise perform some action that requires the motorized drive roller to draw electrical power. At the same time or shortly thereafter, the control module monitors the electrical power line to (or from) the motorized drive roller. If the controller card senses electrical power being drawn, such as via a current or voltage spike on the power line, that is indicative of the motorized drive roller being properly responsive to the control signal, the controller cards determines the motorized drive roller is controlled via the digital or network signal. In other variations, the controller card determines movement or responsiveness of the motorized drive roller by measuring the current (or voltage) on the ground line for the motorized drive roller.

When a response to the digital control signal is detected, the controller card will control the motorized drive roller using digital signals such as those transmitted over the network. On the other hand, if the controller card senses the motorized drive roller is not being responsive to the digital control signal, the controller card assumes the motorized drive roller is controlled via an analog signal (or the roller is broken). For example, the controller card can determine that the motorized drive roller is not responsive when the controller card senses no (i.e., no current and/or voltage change) and/or an incorrect power change on the power line for the motorized drive roller. The controller card then can apply different analog control signals in a similar fashion to determine the correct or emblematic analog communication protocol for communicating with the motorized drive roller. In a similar fashion, the controller card is able to determine if the motorized drive roller is a 24V or 48V type roller by applying the appropriate signal to the corresponding output pin of the control card and monitoring for a response such as drive roller movement based on electrical changes on the power or ground line for the motorized drive roller. To minimize the risk for damage, lower voltages are used. For instance, a 5V threshold is used when determining whether a 24V or 48V motorized drive roller is being used. Once determined, the controller card will control the motorized drive roller using the determined analog signal and/or voltage rating.

It should be recognized that the movement or responsiveness of the motorized drive roller can be detected in other manners. For example, photoeyes and/or proximity sensors can be used to directly sense movement of the motorized drive roller or indirectly sense movement by monitoring the location of an object, such as a package, moved by the conveyor section powered by the motorized drive roller. In still yet another variation, a vision system can be used for monitoring the response of the motorized drive roller. However, it should be appreciated that by monitoring the electrical properties of the motorized drive roller eliminates the need for these external sensors which can reduce the overall implementation cost.

The above-described technique is further adapted to facilitate a sensor-less or photoeye-less zero pressure (ZP) conveyor system. In some traditional conveyor systems, adjacent packages contact one another so as to create back pressure for moving or pushing the packages along the conveyor. This back pressure can result in damage to the packages and/or can cause package jamming on the conveyor. In contrast, packages do not touch on zero pressure conveyors. In zero pressure conveyors, adjacent packages or other items moved by the conveyor are spaced apart such that there is no significant pressure between the packages. To maintain this gap between the packages, sensors, like photoeyes, are commonly used to monitor the location of items on the conveyor zone. However, the photoeyes add cost to the overall system and can be damaged.

Instead of using sensors, the controller cards in this system monitor the electrical power properties of the motorized drive rollers or other associated rollers. For example, the controller cards in one variation monitor the current profile for the motorized drive rollers in particular conveyor zones. When an item, such as a package, cart, tote, etc., is actively moved by the motorized drive roller more electric power is typically drawn as compared to when nothing is moved. When an item leaves the conveyor zone, there is usually a spike in current (or voltage) for the motorized drive roller which is indicative that the package is no longer present in that zone. The size of the current spike is indicative of the weight of the item moved in the conveyor zone, and the duration of the particular current profile or the duration between successive current spikes is used by the controller card to determine the length of the item. Based on the length and/or size of the item as determined by the current profile, the controller card is able to adequately space the items so as to eliminate or minimize contact between adjacent items on the conveyor without the need for package sensors. In other variations, the system includes some sensors for other monitoring purposes or to serve as a backup for confirmation purposes, but the number of sensors is less than the number required for traditional zero pressure conveyor systems.

In one form, the controller cards of different zones communicate with one another over a CAN so as to hand off control for packages or other items when moving between the zones. For example, when a controller card in an upstream zone detects a package by monitoring the current profile of one or more motorized drive rollers and/or other rollers in the upstream zone, the upstream controller card through the CAN communicates with one or more controller cards that control conveyor zones located downstream from the upstream zone. In one version, the controller card on the CAN communicates this information using a sideband communication channel on the CAN.

When a package jam, dangerous conditions, or other emergency situations occur, an operator or the overall system may initiate an emergency stop or e-stop. During an e-stop, the power to a particular conveyor zone may be disconnected. When that occurs, the controller card experiences a power loss which can wipe out the above-mentioned motorized drive roller control settings as well as other settings. After rebooting, the controller card then has to be manually or automatically reprogrammed which can take valuable time. The controller card is configured to support a secondary power source that allows the motorized drive roller to retain settings during e-stop conditions. In one case, the controller card draws power from a 24V source during e-stop conditions.

The system and techniques as described and illustrated herein concern a number of unique and inventive aspects. Some, but by no means all, of these unique aspects are summarized below.

Aspect 1 generally concerns a conveyor system.

Aspect 2 generally concerns the system of any previous aspect including a controller card.

Aspect 3 generally concerns the system of any previous aspect including a motorized drive roller.

Aspect 4 generally concerns the system of any previous aspect in which the motorized drive roller is operatively connected to the controller card.

Aspect 5 generally concerns the system of any previous aspect in which the controller card configured to determine a type of the motorized drive roller.

Aspect 6 generally concerns the system of any previous aspect in which the controller card is configured to determine the type based on a response of the motorized drive roller to a signal sent to the motorized drive roller.

Aspect 7 generally concerns the system of any previous aspect in which the signal is a digital signal.

Aspect 8 generally concerns the system of any previous aspect in which the controller area network (CAN) operatively connecting the controller card to the motorized drive roller.

Aspect 9 generally concerns the system of any previous aspect in which the controller card is configured to send the digital signal over the CAN.

Aspect 10 generally concerns the system of any previous aspect in which the signal is an analog signal.

Aspect 11 generally concerns the system of any previous aspect in which the controller card is configured to send the analog signal to the motorized drive roller.

Aspect 12 generally concerns the system of any previous aspect in which the analog signal is a ramp up in voltage up to at most 5 volts.

Aspect 13 generally concerns the system of any previous aspect in which the signal is a first signal.

Aspect 14 generally concerns the system of any previous aspect in which the controller card is configured to send a second signal when the response to the first signal is nonexistent or incorrect.

Aspect 15 generally concerns the system of any previous aspect in which the first signal is a digital signal and the second signal is an analog signal.

Aspect 16 generally concerns the system of any previous aspect in which the response includes movement of the motorized drive roller.

Aspect 17 generally concerns the system of any previous aspect in which the response includes a change in an electrical property of the motorized drive roller.

Aspect 18 generally concerns the system of any previous aspect in which the electrical property includes current drawn by the motorized drive roller.

Aspect 19 generally concerns the system of any previous aspect in which the controller card is configured to determine whether the motorized drive roller is an analog or digital type motorized drive roller.

Aspect 20 generally concerns the system of any previous aspect in which the controller card is configured to determine whether the motorized drive roller is a 24V or 48V type motorized drive roller.

Aspect 21 generally concerns the system of any previous aspect in which the controller card is configured to orient items on a conveyor in a zero pressure configuration without information from external sensors.

Aspect 22 generally concerns the system of any previous aspect in which the controller card is configured to sense position of the items based on an electrical profile of a motorized drive roller.

Aspect 23 generally concerns the system of any previous aspect in which the electrical profile includes a current spike.

Aspect 24 generally concerns the system of any previous aspect in which the electrical profile includes duration of the current spike.

Aspect 25 generally concerns the system of any previous aspect in which the duration of the current spike is indicative of item length.

Aspect 26 generally concerns the system of any previous aspect in which the electrical profile is indicative of item weight.

Aspect 27 generally concerns the system of any previous aspect in which the controller card includes a primary power source configured to power the motorized drive roller.

Aspect 28 generally concerns the system of any previous aspect in which the controller card includes a secondary power source to retain settings of the controller card.

Aspect 29 generally concerns the system of any previous aspect in which the controller card has a switch to disconnect the primary power source while retaining power on the secondary power source.

Aspect 30 generally concerns a method of operating the system of any previous aspect.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
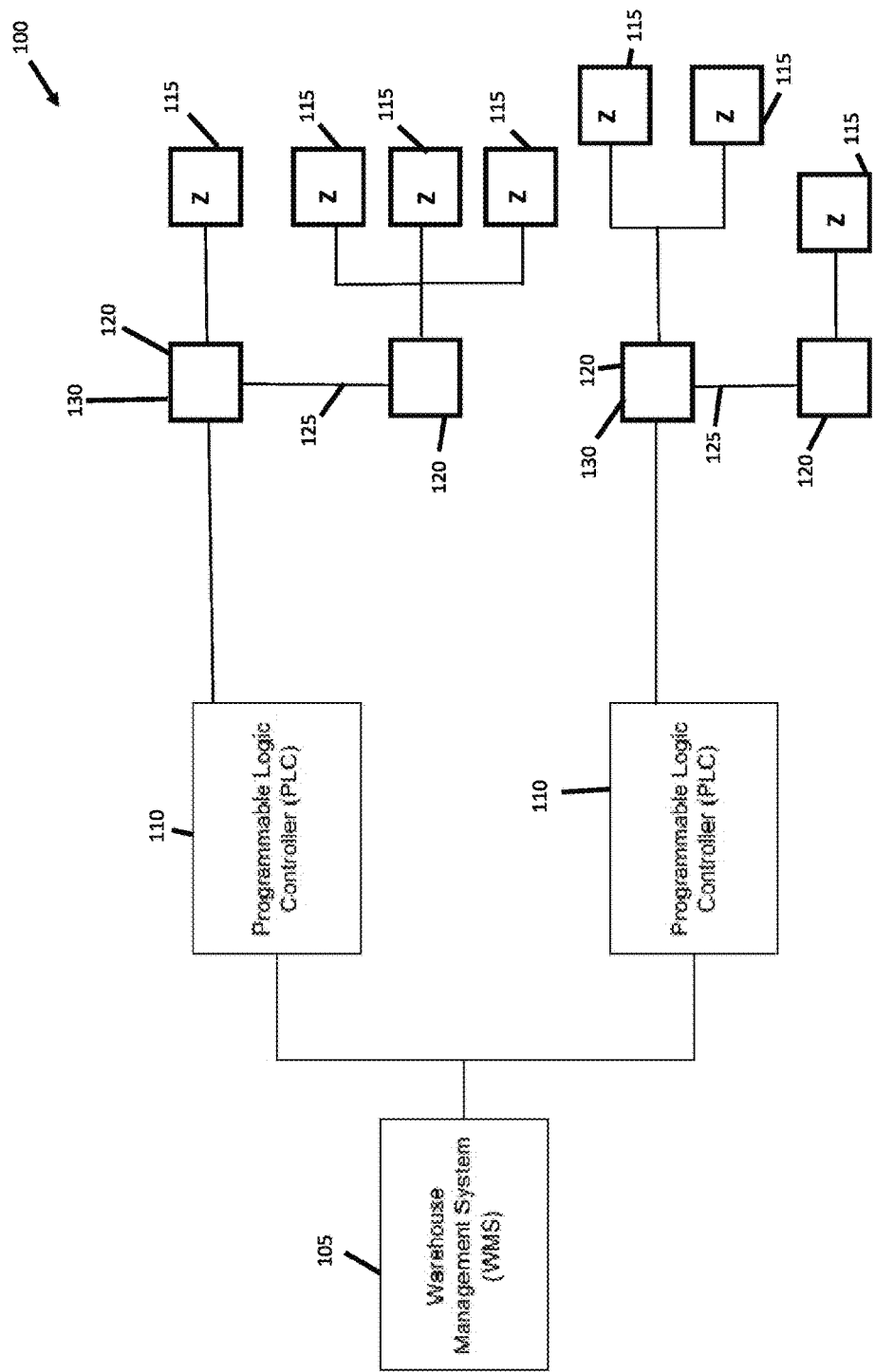
FIG. 1 is a block diagram of a conveyor system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

One example of a conveyor system 100 that addresses the above-mentioned issues as well as other issues is illustrated in FIG. 1. As shown, the conveyor system 100 includes a warehouse management system (WMS) 105 for monitoring and/or controlling the flow of packages or other items within a facility such as a warehouse or manufacturing plant. The conveyor system 100 further includes one or more programmable logic controllers (PLCs) 110 operatively connected to the warehouse management system 105 such as via a wired and/or wireless connection. In other embodiments, the programmable logic controllers 110 may be replaced with a robot management system. The robot management system is constructed to take over operation of the conveyor system 100 from the programmable logic controllers 110. Each programmable logic controller 110 is configured to monitor and/or control the operation of conveyor equipment within one or more conveyor zones 115. In the illustrated example, the conveyor zones 115 each have a controller card 120 configured to control and/or monitor the operation of conveyor equipment within their respective conveyor zones 115.

The controller cards 120 are daisy-chained together through a physical, wired connection in one example. As can be seen in some configurations, each of the controller cards 120 that are daisy-chained together are able to control one or more conveyor zones 115. In one example, each controller card 120 controls a single conveyor zone 115, but in other examples, a single controller card 120 may control two or more conveyor zones 115. As can seen in the illustrated example, a combination approach is used where some of the controller cards 120 control a single conveyor zone 115 and other controller cards 120 control multiple conveyor zones 115. The controller cards 120 in other configurations shown in FIG. 1 are daisy-chained across multiple conveyor zones 115. In the illustrated example, the controller cards 120 are operatively connected in a serial manner via one or more communication cables 125. In one variation, the communication cable 125 is in the form of an Ethernet type cable. As should be appreciated, an Ethernet cable commonly (but not always) is in the form of a cable containing twisted pairs of wires, such as a category 5 or 6 cable, with 8 position 8 contact (8P8C) modular connectors usually at both ends that are commonly referred to as registered jack 45 (RJ45) connectors. The RJ45 connectors are typically, but not always, plugged into a corresponding RJ45 plug to facilitate communication between the connected devices.

Together, the controller cards 120 form a controller area network (CAN) or local area network (LAN). In addition to the standard CAN communication protocol, the controller cards 120 further communicate amongst themselves using a sideband communication protocol that is outside the realm of the standard CAN communication protocol. The sideband communication protocol allows the controller cards 120 to communicate with each other without interfering with normal network communications which in turn provides additional capabilities.

In some types of communication standards, the full capacity of the physical communication channel is not used. For example, with the 10BASE-T or 100BASE-TX protocols, an Ethernet cable with the TS568A or T568B connector wiring assignments, only connector pins 1, 2, 3, and 6 (e.g., striped white/green, solid green, white/orange, and solid orange wires) of the RJ45 connector are generally used for communications. On the other hand, pins 4 and 5 (i.e., solid blue and striped white/blue wires) as well as pins 7 and 8 (striped white/brown and solid brown wires) are generally not used to communicate data.

The controller cards 120 use this untapped or unused channel capacity in the Ethernet cable to form a sideband communication channel or network that allows the controller cards 120 to communicate with one another along the chain of controller cards 120. In one version, one or more of the unused twisted pair wires or pins (e.g., pins 4 and 5) within an Ethernet cable form a sideband communication channel that facilitates sideband communication between the controller cards 120 using a serial communication protocol such as via universal asynchronous receiver-transmitter (UART) hardware. In one particular example, the communication cables 125 are in the form of Ethernet cables in which pins 4 and 5 of the RJ45 connectors are used to communicate using the RS-485 standard for robust serial communications. In other variations, pins 7 and 8 are alternatively or additionally used for the sideband communication between the controller cards 120 via the RS-485 standard. The RS-485 communication standard is especially helpful for sideband communications in the conveyor system 100 because the conveyor system 100 is typically used in electrically noisy environments like warehouses and manufacturing plants. The communications on this sideband communication channel do not interfere with the normal Ethernet communications between the conveyor zones 115 and controller cards 120 on the other wires within the communication cable 125 (e.g., RJ45 connector pins 1, 2, 3, and 6).

It should be recognized that this sideband communication technique can be used with other types of communication cables 125 so long as channel space is available for sideband communications. For example, while 8P8C modular connectors and paired wires were described above, it should be recognized that the sideband communication technique can be used in different designs that have more or less wires/pins. For instance, the sideband can be used in communication cables 125 that have 6 pin 6 connector (6P6C) type modular connectors (e.g., RJ11, RJ14, or RJ25 connectors) or 10 pin 10 connector (10P10C) type modular connectors (e.g., RJ50 connectors). Other examples of the communication cables 125 do not require twisted or untwisted wire pairs. For instance, the communication cable 125 can include a coaxial cable or fiber optic cable, and the unused communication channel space on the coaxial or fiber optic cable is used for sideband communications between the controller cards 120. In other variations, a wireless communication network (e.g., Wi-Fi) is used for communications between the controller cards 120, and some or all of the unused spectrum or channels is used to form a sideband communication network between the controller card 120.

Again, as can be seen in FIG. 1, the controller cards 120 are daisy-chained together with the communication cables 125. At the end of this chain, proximal to the programmable logic controller 110, the controller card 120 at this position is designated the chain master 130 (or gateway) through which communications to and from the programmable logic controller 110 and the controller cards 120 within the conveyor zone 115 are funneled.

The programmable logic controllers 110 through the CAN are further adapted to remotely configure or reconfigure the controller card 120. For instance, each controller card 120 in one version has inputs and outputs that are reconfigurable. The programmable logic controller 110 in one form is able to reprogram or override the default settings of the inputs and/or outputs of the controller card 120. The programmable logic controllers 110 in one variation reprogram the controller card 120 to send a notification over the CAN to the programmable logic controllers 110 when one or more conditions occur. For example, the controller card 120 can be programmed to send a notification when a conveyor zone 115 is empty and/or when an attached photoeye senses the presence or absence of an object. The programmable logic controllers 110 in one form treat the input/output of the controller card 120 as a gate. In other words, the programmable logic controller 110 is able to reconfigure the controller card 120 so that the card is able to act as a remote sensor without the need for installing a separate output extender.

Figure 2:
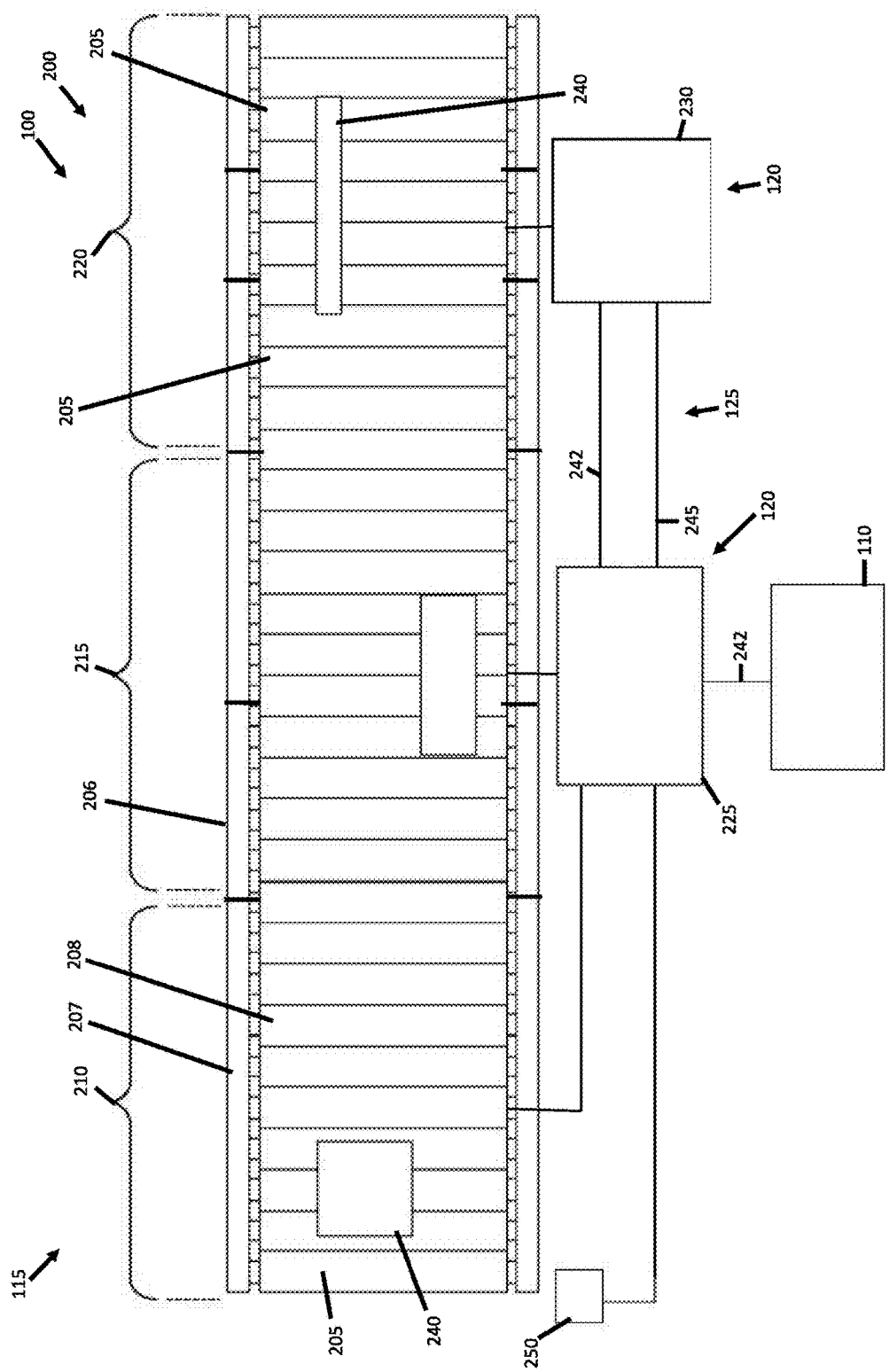
FIG. 2 is a block diagram of a conveyor system.

One example of a conveyor system 200 that is used with the conveyor system 100 is depicted in FIG. 2. As shown, the conveyor system 200 includes one or more conveyors 205 organized into various conveyor zones 115. In the illustrated example, the conveyor 205 is a roller type conveyor, but it should be recognized that the conveyor 205 can include other types of conveyors like belt conveyors and slat conveyors. As depicted, each conveyor 205 includes a frame 206 with opposing rails 207 that support rollers 208 and are configured to convey or otherwise transport various packages or other items. The rollers 208 of the conveyor 205 for instance can include powered rollers, unpowered rollers, or any combination thereof.

The conveyors 205 are organized into the various conveyor zones 115. In the depicted example, the conveyor zones 115 include a first zone 210, a second zone 215, and a third zone 220, but it should be recognized that other configurations of the conveyor system 100 can include more or less conveyor zones 115. Each conveyor zone 115 can include one or more of the conveyors 205. Some or all of the conveyor zones 115 can include a single conveyor 205 in certain configurations, and the conveyor zones 115 in other configurations can have multiple conveyors 205.

As noted above with respect to FIG. 1, the controller cards 120 in the conveyor zones 115 are daisy-chained together via the individual communication cables 125. The daisy-chained controller cards 120 can control a single conveyor zone 115 or can control multiple conveyor zones 115. The controller card 120 in the chain connected to the programmable logic controller 110 is once more the chain master 130 for the chain of controller cards 120. The chain master 130 typically, but not always, is connected to the programmable logic controller 110 using the same type of communication cable 125 connecting the controller cards 120 together. For instance, the chain master 130 in one form is connected to the programmable logic controller 110 via an Ethernet cable. In one variation, the sideband communication along the communication cable 125 is limited to communications between the controller cards 120, and the controller cards 120 do not communicate with the programmable logic controller 110 via the sideband communication link. In other variations, the controller cards 120 can communicate with the programmable logic controller 110 via a sideband communication link.

The controller cards 120 are operatively connected to the conveyors 205, sensors, equipment, and/or other devices within the corresponding conveyor zone 115. In turn, the controller cards 120 are able to monitor the operation of and control the conveyors 205 within the particular conveyor zone 115. For instance, the conveyor zone 115 can be used to instruct one or more rollers 208 within the conveyor zone 115 to move or stop. For explanation purposes, the controller card 120 controlling a particular conveyor zone 115 may be identified by the zone number. For example, the controller card 120 controlling the first zone 210 may be referred to as a first controller card 225, and the controller card 120 controlling the third zone 220 may be referred to as a second controller card 230. With the controller cards 120, the warehouse management system 105 and/or programmable logic controller 110 is able to monitor and control movement of one or more packages 240 or other items on the conveyors 205 in the various conveyor zones 115.

As mentioned previously, the controller cards 120 are typically connected via the communication cables 125, and the communication cable 125 has a main/primary CAN communication link or main communication channel 242 and a sideband communication channel 245. The sideband communication channel 245 enables the controller cards 120 to exchange information relating to status, package location, and/or other pertinent data without interrupting communications along the main communication channel 242. In one example, the communication cables 125 are in the form of Ethernet cables using the TS568A (or T568B) connector wiring (pin) assignments. In this example, the main communication channel 242 uses the 10BASE-T or 100BASE-TX protocols such that connector pins 1, 2, 3, and 6 of the RJ45 connector along with the corresponding wires form the main communication channel 242. The warehouse management system 105 and/or programmable logic controller 110 communicate with the controller cards 120 using the 10BASE-T or 100BASE-TX protocols along this primary, main communication channel 242. In this example, pins 4 and 5 of the RJ45 connector and the corresponding wires in the communication cable 125 form the sideband communication channel 245 along which the controller cards 120 are able to communicate with each other using the RS485 serial communication protocol.

Once more, it should be recognized that other types of communication protocol can form the main communication channel 242 and sideband communication channel 245. For instance, when a wireless communication network is used for communications between the controller cards 120, the carrier can be used for the main communication channel 242, and the upper sideband (USB) and/or lower sideband (LSB) can be used for the sideband communication channel 245.

Other types of devices or sensors besides the conveyor 205 can be operatively connected to the controller cards 120. In the illustrated example of FIG. 2, the conveyor system 200 has a photoeye 250 that is operatively connected to one of the controller cards 120. The photoeye 250 detects the presence of the package 240 in a particular conveyor zone 115. The photoeye 250 then shares the package 240 information with the controller card 120 within the proper conveyor zone 115. To track the progress of the package 240, the first controller card 225, which controls the first zone 210 and the second zone 215, transmits a package identifier via the sideband communication channel 245 to the second controller card 230 as the package 240 moves from the second zone 215 to the third zone 220. This process continues downstream until reaching the end of the conveyor system 200.

Figure 3:
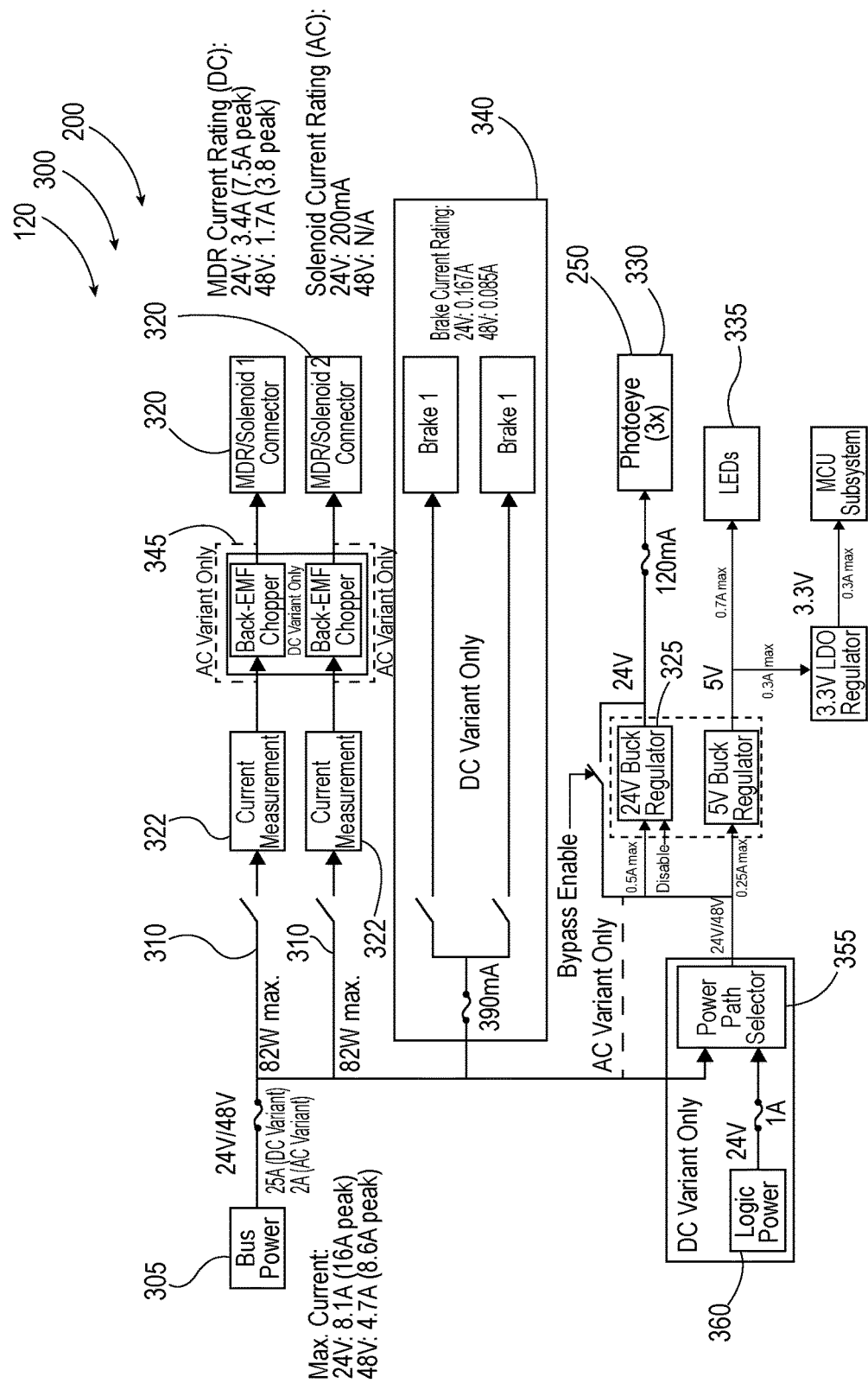
FIG. 3 is a block diagram of a power system.

As shown in FIG. 3, each controller card 120 of the conveyor system 200 includes a power system 300 for supplying and controlling power to the controller card 120 as well as other equipment such as the conveyor 205 and the rollers 208. The power system 300 includes bus power 305. In some examples, the bus power 305 is 24 volts (V). However, in other examples the bus power 305 is 48V. The bus power 305 flows through a series of parallel paths where power flow is controlled via a number of switches 310. The switches 310 typically function in an open/closed manner where an open switch does not allow power flow and a closed switch does allow power flow.

In an alternating current (AC) system the power continues to flow into a conveyor power connector 320 that for example supplies power to an electrically powered component of the conveyor 205. For instance, the conveyor power connector 320 may power a motorized drive roller (MDR), a solenoid, and/or another device requiring AC power to operate. The AC power may also flow to one or more photoeyes 250. Current drawn to power the components connected to the conveyor power connector 320 is measured via one or more current sensors 322.

In a direct current (DC) system the power is changed from fixed DC to variable DC power. Typically, this is done via a chopper 345 integrated into the system upstream of the conveyor power connector 320. A brake 340 is also included in the DC system. The DC system may also include logic power 350 configured to power the control logic of the conveyor system 200. The logic power 350 may also run into a power path selector 355, which sends the DC power through one or more regulators 325. From the regulators 325 power may flow into one or more photoeyes 330 and/or one or more light emitting diodes 335.

Figure 4:
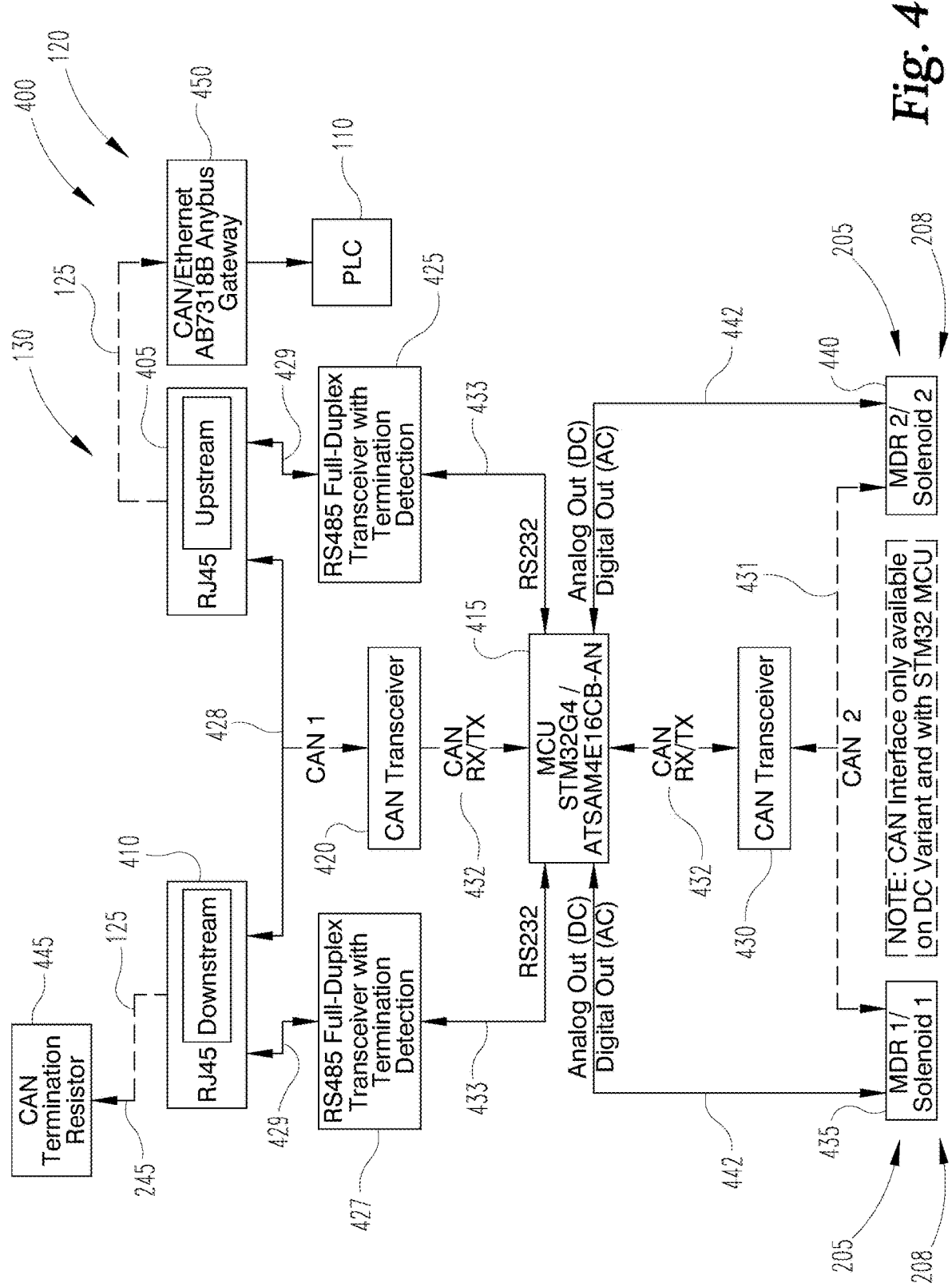
FIG. 4 is a block diagram of a communication system.

Turning to FIG. 4, an example of a communication system 400 for the controller card 120 is shown. The communication system 400 includes an upstream port 405 and a downstream port 410. Generally, the upstream port 405 of a controller card 120 is connected to the downstream port 410 of a preceding controller card 120 or the programmable logic controller 110. Likewise, the downstream port 410 is connected to the upstream port 405 of following controller cards 120 or to generally nothing. In one example, the upstream port 405 and downstream port 410 are in the form of RJ45 type sockets configured to receive corresponding connector plugs of the communication cable 125 in the form of an Ethernet cable. The connections at the upstream port 405 and downstream port 410 can be configured differently in further variations. In still yet other examples, the connections may be wireless.

The upstream port 405 and downstream port 410 communicate with a motor control unit 415 via a first network carrier transceiver 420 along with an upstream sideband transceiver 425 and a downstream sideband transceiver 427. In the illustrated example, the first network carrier transceiver 420 is in the form of a controller area network (CAN) transceiver that transmits and receives communications from the programmable logic controllers 110 and other controller cards 120 along the main communication channel 242 of the communication cable 125. As shown, the first network carrier transceiver 420 is operatively connected to the upstream port 405 and downstream port 410 via the first carrier network connection 428. The upstream sideband transceiver 425 and downstream sideband transceiver 427 are operatively connected to the upstream port 405 and downstream port 410, respectively, via one or more sideband connections 429. The upstream sideband transceiver 425 receives and transmits sideband communications from controller cards 120 located upstream from the current controller card 120 via the upstream port 405, and the downstream sideband transceiver 427 receives and transmits sideband communications from controller cards 120 located downstream from the current controller card 120. As should be appreciated, the sideband communications via the upstream sideband transceiver 425 and downstream sideband transceiver 427 can generally occur without interfering with normal communications via the first network carrier transceiver 420.

Returning to the previously described Ethernet example where the communication cables 125 are in the form of Ethernet cables using the TS568A (or T568B) connector pin assignments, the main communication channel 242 uses the 10BASE-T or 100BASE-TX protocols such that connector pins 1, 2, 3, and 6 of the RJ45 connector along with the corresponding wires form the main communication channel 242. Via pins 1, 2, 3, and 6 of the upstream port 405 and/or the downstream port 410, the first network carrier transceiver 420 communicates with the programmable logic controller 110 and/or other controller cards 120 using the Ethernet protocols along the primary, main communication channel 242 of the communication cable 125. In this same example, pins 4 and 5 of the RJ45 connector and the corresponding wires in the communication cable 125 form the sideband communication channel 245 along which the controller cards 120 are able to communicate with each other using the RS485 serial communication protocol.

As depicted, the motor control unit 415 is operatively connected to the first network carrier transceiver 420, upstream sideband transceiver 425, and downstream sideband transceiver 427 so as to be able to communicate along the main communication channels 242 and sideband communication channels 245 of the communication cables 125. The motor control unit 415 is further operatively connected to other components in the corresponding conveyor zone 115. For instance, the motor control unit 415 is operatively connected to a second network carrier transceiver 430 that communicates with components of the conveyor zone 115 (e.g., the conveyor 205, photoeye 250, etc.) through a conveyor or second carrier network 431. Both the first network carrier transceiver 420 and second network carrier transceiver 430 are operatively connected to the motor control unit 415 through motor control unit carrier links 432. The upstream sideband transceiver 425 and downstream sideband transceiver 427 are operatively connected to the motor control unit 415 via one or more motor control unit sideband links 433.

With continued reference to FIG. 4, the motor control unit 415 via the second carrier network 431 is operatively connected to a first electrical device 435 and a second electrical device 440. Alternatively or additionally, the motor control unit 415 is directly connected to the first electrical device 435 and second electrical device 440 via one or more direct conveyor connections 442. The direct conveyor connections 442 can include digital or analog type connections. The first electrical device 435 and second electrical device 440 can include rollers 208 in the form of motorized drive rollers (MDRs), solenoids, or other equipment and/or sensors (e.g., photoeyes 250) associated with the conveyors 205. Through the second network carrier transceiver 430 and/or direct conveyor connection 442, the motor control unit 415 is able to monitor and control the rollers 208. For instance, the motor control unit sideband link 433 is able to power and control the speed and operation of MDRs in the conveyors 205 as packages 240 are transported on the conveyors 205. Information from the conveyors 205 as well as sensors associated with the conveyors 205 is processed via the motor control unit 415 and communicated to the programmable logic controllers 110 and/or controller cards 120 via the main communication channels 242 and/or sideband communication channels 245. For instance, the motor control unit 415 can be used to track packages 240 as the packages 240 travel on and between various conveyor zones 115.

Through the upstream sideband transceiver 425, the controller card 120 is able to determine the relative chain location of the controller card 120 along a given daisy-chained set of controller cards 120. The sideband communication capability facilitates in determining whether the controller card 120 is the first controller card 120 in the chain, the last controller card 120 in the chain, or somewhere in the middle.

Looking at FIG. 4, a termination resistor 445 in one example is connected to the downstream port 410 when the controller card 120 is the last one in the chain. By measuring the resistance (or voltage) of the termination resistor 445 (or the sideband communication channel 245 at the downstream port 410), the motor control unit 415 of the controller card 120 is able to determine that the controller card 120 is the last one in the chain. For instance, the termination resistor 445 can have a high resistance which indicates that no downstream controller card 120 is connected to the downstream port 410. On the other hand, when the resistance is within a range that indicates a downstream controller card 120 is connected, then the controller card 120 determines the controller card 120 is not the last one. Alternatively or additionally, when nothing is connected to the sideband communication channel 245 at the downstream port 410 (i.e., open contact), the open signal or very high resistance signifies that no downstream controller card 120 is connected, and the current controller card 120 is the last one in the chain. Returning to the previous Ethernet example, when a high resistance or an open condition is detected at pins 5 and 6 of the RJ45 socket at the downstream port 410, the controller card 120 determines the controller card 120 is the last one in the chain. Alternatively or additionally, the downstream sideband transceiver 427 can broadcast a ping or request a response via the downstream port 410 on the sideband communication channel 245. If no response is received, the controller card 120 is the last one on the chain. Conversely, if a response is received, then the controller card 120 is not the last one in the chain.

In certain cases, the programmable logic controllers 110 of the controller card 120 are directly connected to the upstream port 405 via one of the communication cables 125. Sometimes however, as is shown in FIG. 4, the chain master 130 is indirectly connected to the programmable logic controller 110 through a CAN gateway 450. In either case, the controller card 120 can determine if the controller card 120 is the first one in the chain, or the chain master 130, by communicating via the upstream port 405. For instance, the first network carrier transceiver 420 of the controller card 120 can ping or request a response from the programmable logic controller 110 by communicating over the main communication channel 242 via the upstream port 405. If a response from the programmable logic controller 110 is received, the controller card 120 is the chain master 130. Conversely, when no response is received from the programmable logic controller 110, the controller card 120 is not the first one in the chain. Alternatively or additionally, the upstream sideband transceiver 425 can send a signal (or measure resistance like before) along the sideband communication channel 245 to determine whether another controller card 120 is located upstream. If the signal or measured resistance (or voltage) is indicative of no connection, the controller card 120 infers the controller card 120 is the chain master 130.

The controller card 120 is also configured to determine when the controller card 120 is not installed or not properly installed. For example, using the techniques described above, when the controller card 120 detects that the controller card 120 is not connected at the upstream port 405 and downstream port 410, then the controller card 120 is considered uninstalled or not connected.

Figure 5:
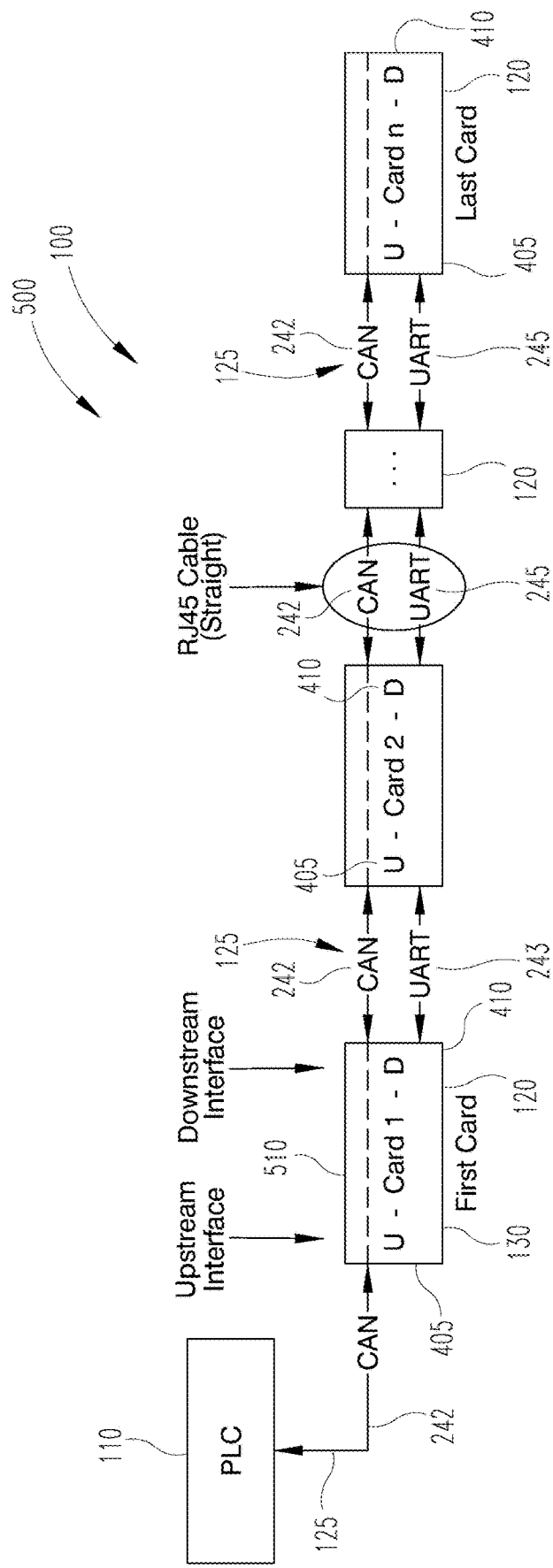
FIG. 5 is a block diagram of a sideband communication system.

One example of a sideband communication system 500 that can be incorporated into the conveyor system 100 is illustrated in FIG. 5. As mentioned previously, the controller card 120 communicates via the sideband communication system 500. The controller cards 120 include a first controller card 510 and a second controller card 520. The first controller card 510 and second controller card 520 are once more operatively connected via the communication cable 125. As noted before, the communication cable 125 includes the main communication channel 242 and the sideband communication channel 245. In the illustrated example, the main communication channel 242 facilitates communication via a controller area network (CAN) type protocol, and the sideband communication channel 245 facilitates communication using a universal asynchronous receiver-transmitter (UART) type protocol.

In this example, the first controller card 510 acts as the chain master 130. The programmable logic controller 110 is operatively connected to the upstream port 405 of the first controller card 510 via the communication cable 125. The first controller card 510 receives a command from the programmable logic controllers 110 via the main communication channel 242 of the communication cable 125. Through the communication cable 125, the downstream port 410 of the first controller card 510 is connected to the upstream port 405 of the second controller card 520. The first controller card 510 passes the command to the next (downstream) second controller card 520 through the communication cable 125. Subsequent downstream controller cards 120 are connected in a similar fashion and communicate in a similar fashion. In one form, the connection of the downstream port 410 of the first controller card 510 to the upstream port 405 of the second controller card 520 is via a RJ45 type ethernet cable. Once more, other types of connections can be used in other examples.

The sideband communication system 500 of the conveyor system 100 is configured to allow the controller cards 120 to automatically self-identify such as during initial installation, replacement, and/or general maintenance. The status or identity of the controller card 120 can be determined in a number of ways. As explained above, the controller card 120 can determine the relative location of the controller card 120 in the chain of controller cards 120 in several ways. Based on this determination of relative location, the controller card 120 can initiate the self-addressing or identification process. For example, if the controller card 120 does not sense a connection or signal on the sideband communication channel 245 at the upstream port 405 of the controller card 120 where the communication cable 125 for an upstream controller card 120 is normally connected, the controller card 120 can self-identify as being the first card in the daisy-chain (e.g., the chain master 130). In an alternative or additional variation, the chain master 130 or first controller card 510 self-identifies by detecting the programmable logic controllers 110 being directly connected to the upstream port 405 of the first controller card 510.

In one version, the chain master 130 self-identifies by self-assigning a specific address or other identifier (e.g., 1), and the remaining controller cards 120 in the chain can increment their addresses relative to the address of the chain master 130 (e.g., 2, 3, etc.). The chain master 130 in other examples can self-identify when a specific sensor, such as a wake-up photoeye 250, is connected to the card. Once the chain master 130 has been identified, the remaining downstream cards are again able to self-identify in a sequential or cascading fashion from the first card (e.g., 2, 3, 4, etc.). For example, the second controller card 520 in one form receives a signal, such as in the form of an address, identifier, and/or command, through the sideband communication channel 245 from the upstream, first controller card 510. In response to receiving the signal, the immediate downstream card self-identifies as the second controller card 520 (e.g., 2), and using the sideband communication channel 245 connected to the downstream port 410 of the second controller card 520, the newly self-identified second controller card 520 communicates with the next downstream controller card 120 so that the third card can self-address or identify in a similar fashion. This process of self-identifying continues in a similar fashion of the remaining controller cards 120 until the last controller card 120 is reached. Each time an address is assigned, the address and other pertinent information can be broadcasted to the other controller cards 120 in the link through the sideband communication network.

As explained above, the last controller card 120 can self-detect its relative position in the chain in several ways. For instance, the last controller card 120 can detect a high resistance or open connection on the sideband link pins in the downstream port 410. The last controller card 120 in the line can also self-identify as being the last controller card 120 in the line by monitoring signals from other connected devices like sensors and/or motors. Once the last controller card 120 is assigned an address, the last controller card 120 can communicate the completion of the process on the sideband communication network. It should be recognized that this technique of self-addressing the controller cards 120 reduces the risk of address errors as well as simplifies installation of new controller cards 120. Moreover, using the sideband communication network (i.e., the sideband communication channels 245) with this technique, reduces congestion on the carrier network or CAN as well as reduces communication errors.

Figure 6:
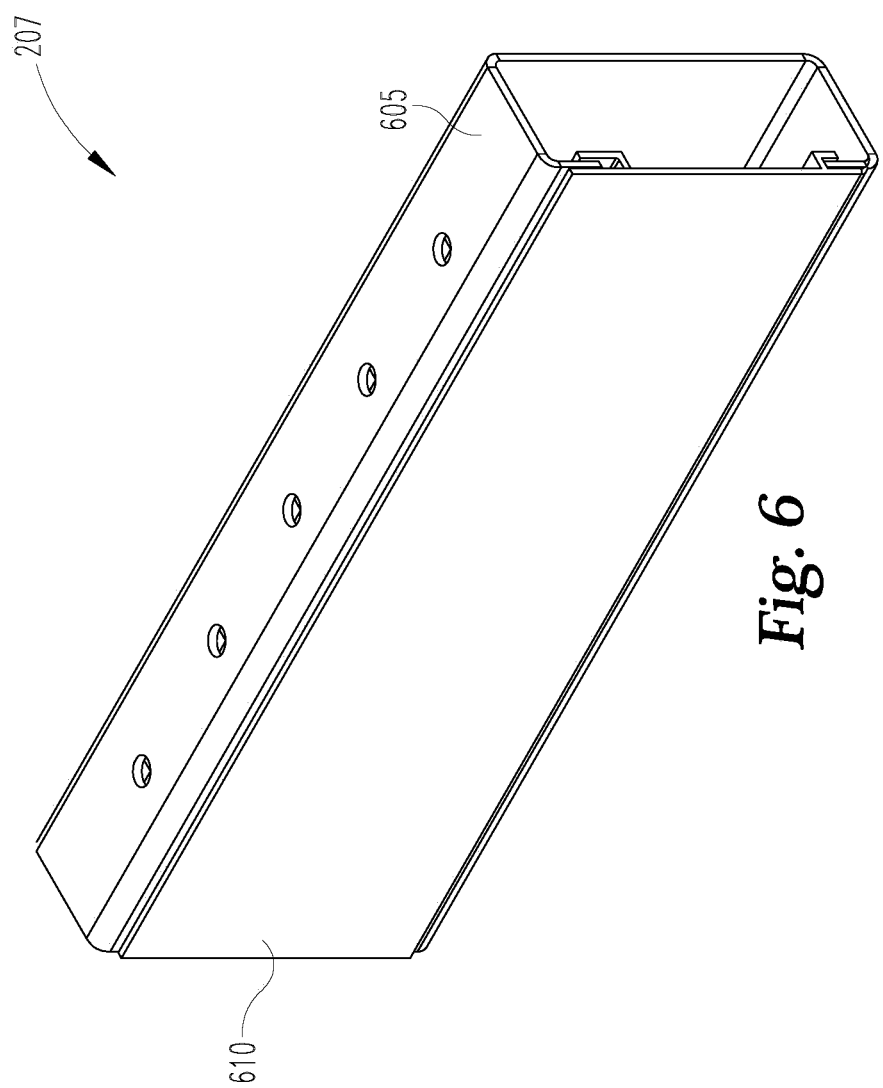
FIG. 6 is a perspective view of a controller card.
Figure 7:
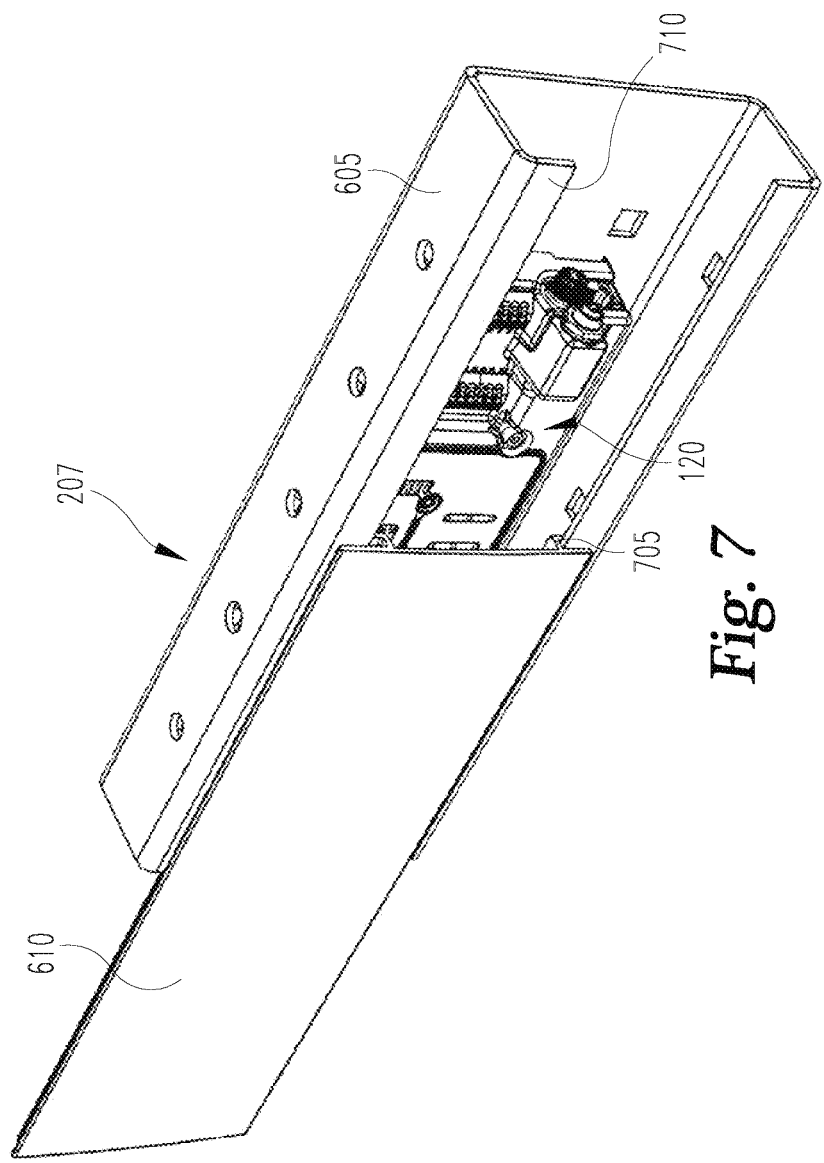
FIG. 7 is a perspective view of the controller card of FIG. 6.
Figure 8:
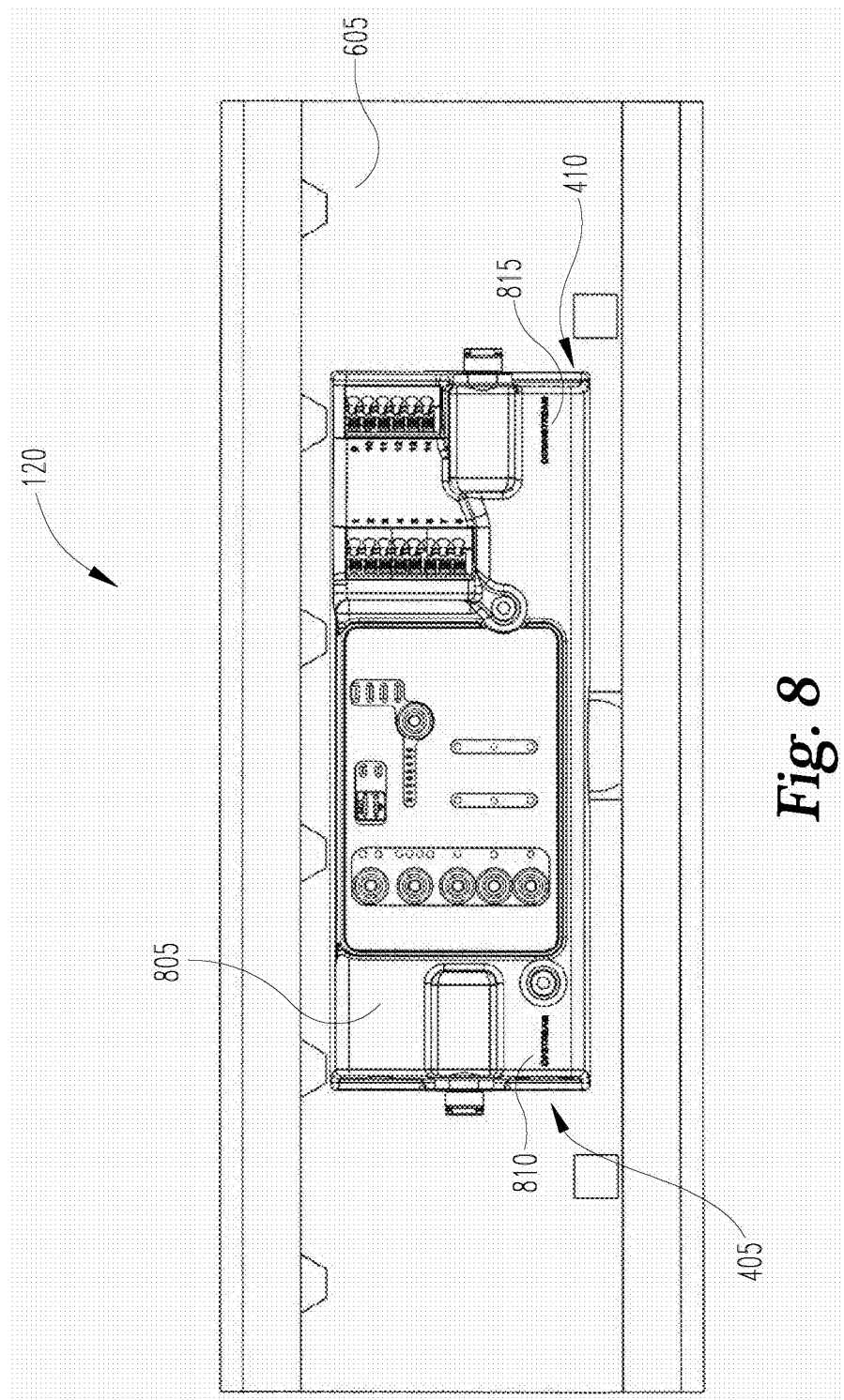
FIG. 8 is a front view of the controller card of FIG. 6.

Shown in FIGS. 6, 7, and 8, is an example of the controller card 120 described previously. The controller card 120 is typically retained within a channel 605 of the rails 207. The controller card 120 may be located behind an access panel 610 to prevent damage to the controller card 120. The access panel 610 is slidably removable from the channel 605 via groove 705. The groove 705 slides on a set of tracks 710 extending from the channel 605. The channel 605 is configured to surround and protect a circuit board 805, an upstream port 810, and a downstream port 815. As should be appreciated, the upstream port 810 corresponds to the upstream port 405 and the downstream port 815 corresponds to the downstream port 410 described in the previous examples.

Figure 9:
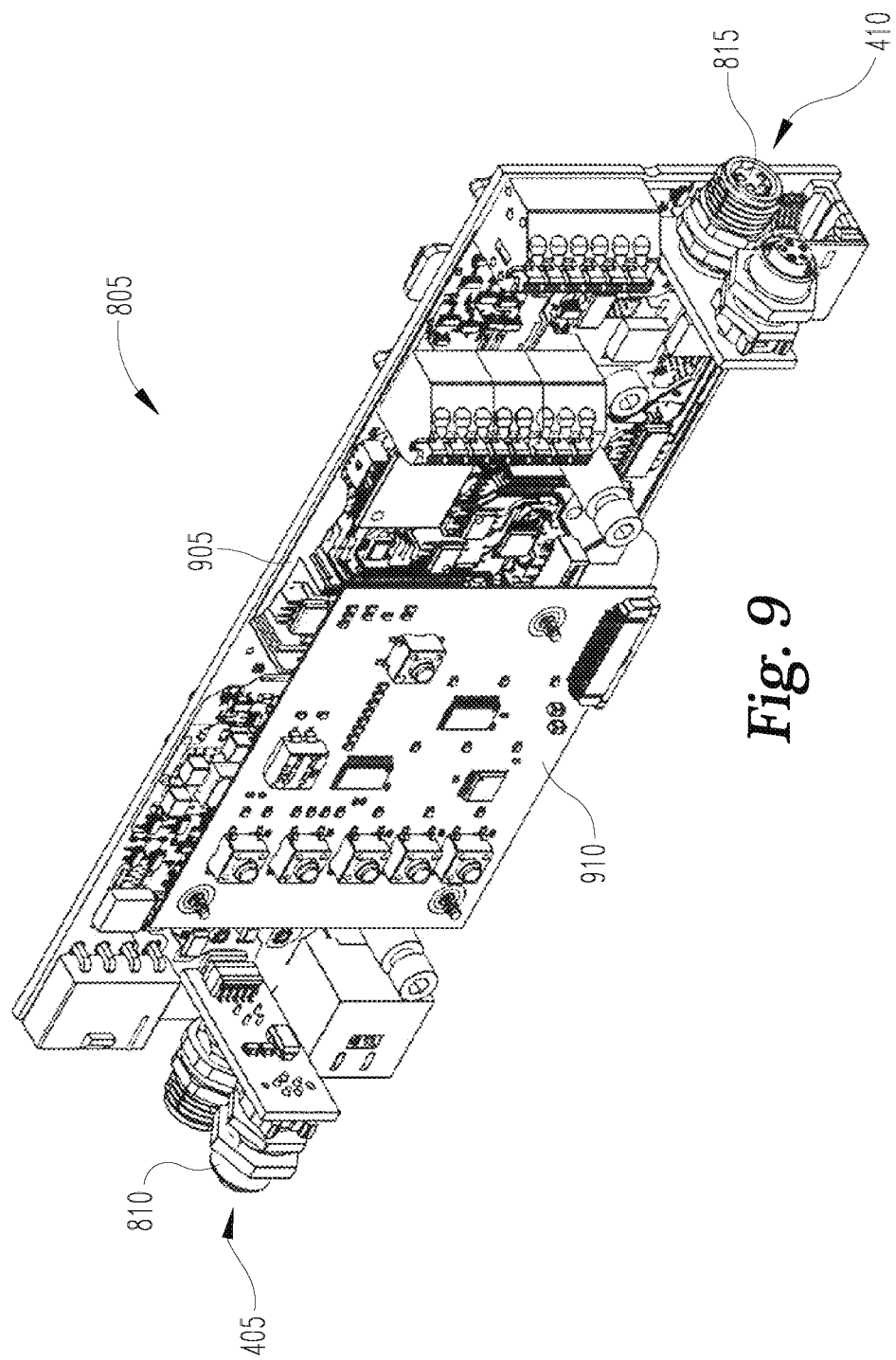
FIG. 9 is a perspective view of a circuit board.
Figure 10:
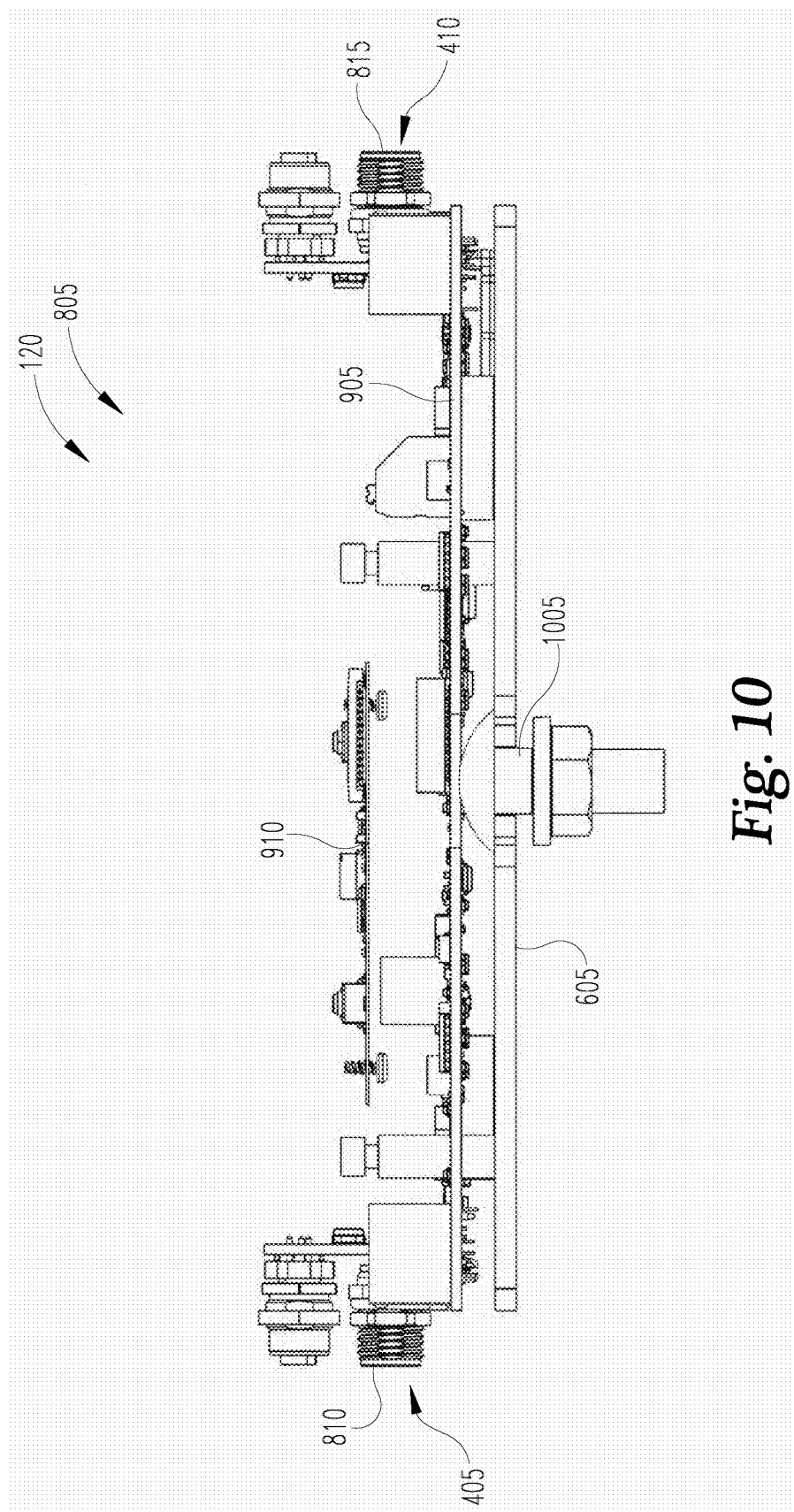
FIG. 10 is a top view of the circuit board of FIG. 9.

As shown in FIGS. 9 and 10, the circuit board 805 includes a main board 905 and a secondary board 910. The controller card 120 is mounted to a desired work location via a fastener 1005. The fastener 1005 may be a screw, bolt, rivet, weld, adhesive, and/or another type of fastener.

As mentioned before, during repair, maintenance, or upgrades, various rollers 208, such as motorized drive rollers (MDRs) that provide the mechanical power for moving packages 240 on the conveyor 205, may be replaced with a new one. However, not all motorized drive rollers are the same. Depending on the type, a motorized drive roller may require either an analog signal or a digital signal for communication and control purposes. Moreover, the voltages for powering the motorized drive roller can vary. For example, older types of motorized drive rollers are typically powered by 24 volts (V), but newer motorized drive rollers tend to require 48V. Providing an improper control signal or power voltage may result in the conveyor 205 not operating properly, or worse yet, may destroy the controller card 120 and/or the rollers 208. Therefore, great care must be taken when replacing motorized drive rollers or their controllers. When a different type of motorized drive roller is installed (or different kind of controller card 120), the maintenance worker must confirm the motorized drive roller is compatible with the controller card being used. Moreover, some replacements may require manual reprogramming of the controller card 120 or a complete replacement of the controller card 120. Time is critical when a conveyor is down, and these checks and reprogramming activities can be both time consuming and costly.

Figure 11:
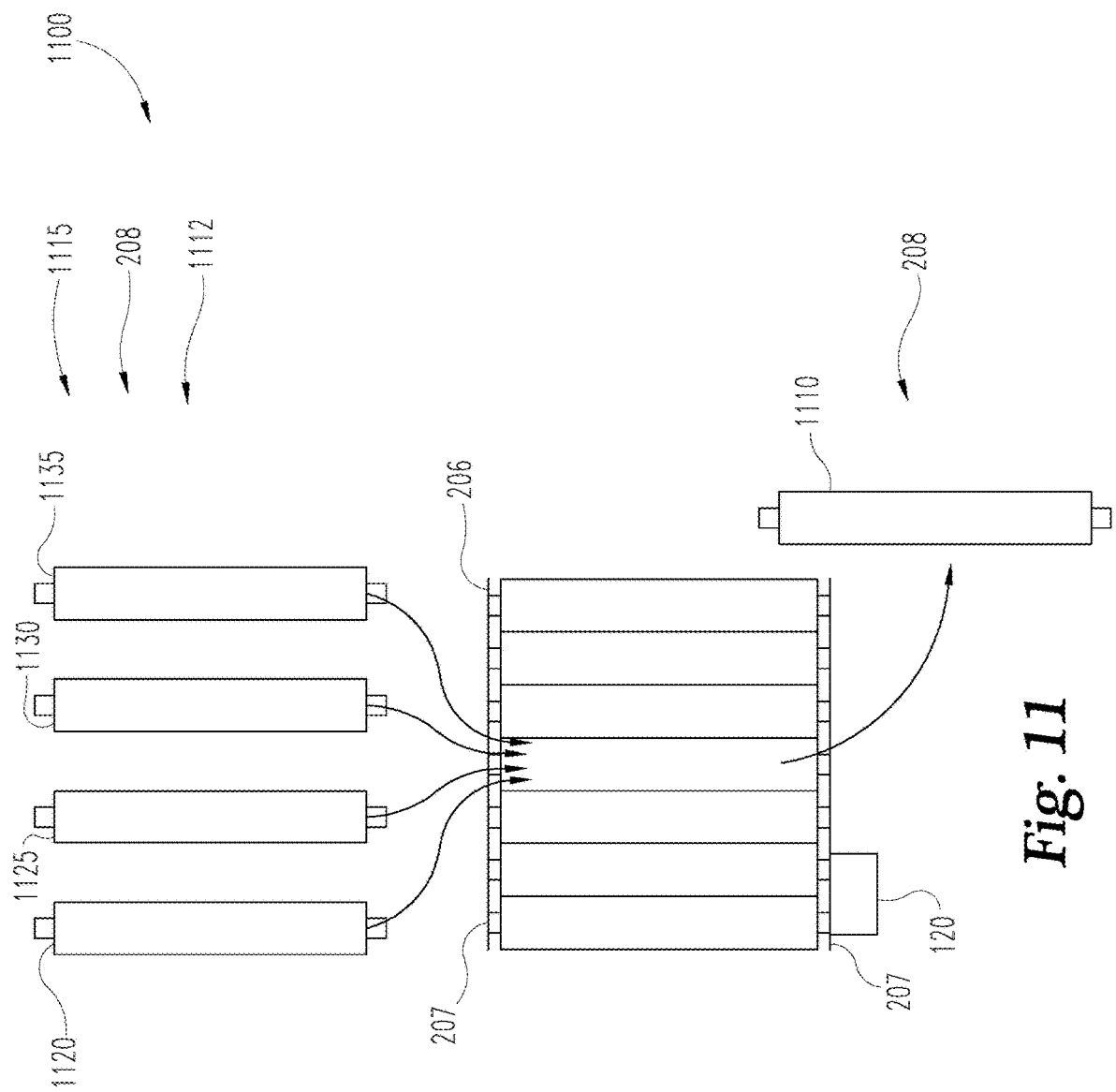
FIG. 11 is a diagrammatic view of a conveyor maintenance area.

The controller cards 120 in the conveyor system 100 are configured to address these as well as other issues by automatically detecting the type of rollers 208 installed and automatically adjusting communications for the particular roller type. FIG. 11 shows a diagrammatic view of a conveyor maintenance area 1100 where one or more of the rollers 208 are replaced. As shown, the conveyor maintenance area 1100 includes a conveyor section 1105 with a failed roller 1110. For example, the failed roller 1110 can include a motorized drive roller (MDR) 1112 or an unpowered roller 208. The motorized drive roller 1112 can for instance be an AC roller, DC roller, 24V roller, and/or 48V roller, to name just a few examples. In the illustrated example, the failed roller 1110 is replaced with a replacement roller 1115. Sometimes, the replacement roller 1115 is not the same type of roller 208 as the failed roller 1110. For example, the different replacement roller 1115 can be installed to upgrade the conveyor 205, and occasionally, when replacement parts are in short supply, the replacement roller 1115 may be an older or deprecated roller 208. By way of non-limiting examples, the replacement roller 1115 can include a 24V roller 1120, a 48V roller 1125, an analog roller 1130, and/or a digital roller 1135. In one version, the failed roller 1110 is an older type 24V roller and the replacement roller 1115 is a newer 48V roller. As should be appreciated, changing the roller type after a failure or routine maintenance enables the conveyor 205 to be gradually updated to the newer motorized drive rollers 1112 as older motorized drive rollers 1112 fail.

When the conveyor zone 115 is installed in the frame 206 of the conveyor 205 and connected to the controller card 120, the controller card 120 for the conveyor section 1105 determines the type of roller 208 installed. For instance, the controller card 120 determine whether the replacement roller 1115 is a 24V roller 1120, a 48V roller 1125, an analog roller 1130, and/or a digital roller 1135 by conducting a series of tests. As should be appreciated, this automatic roller detection process allows a user to order only a single type or stock keeping unit (SKU) as the controller card 120 can operate any form of rollers 208. This simplifies the logistics and stock keeping process and assist in saving time and money for a user via a simplified ordering process.

Figure 12:
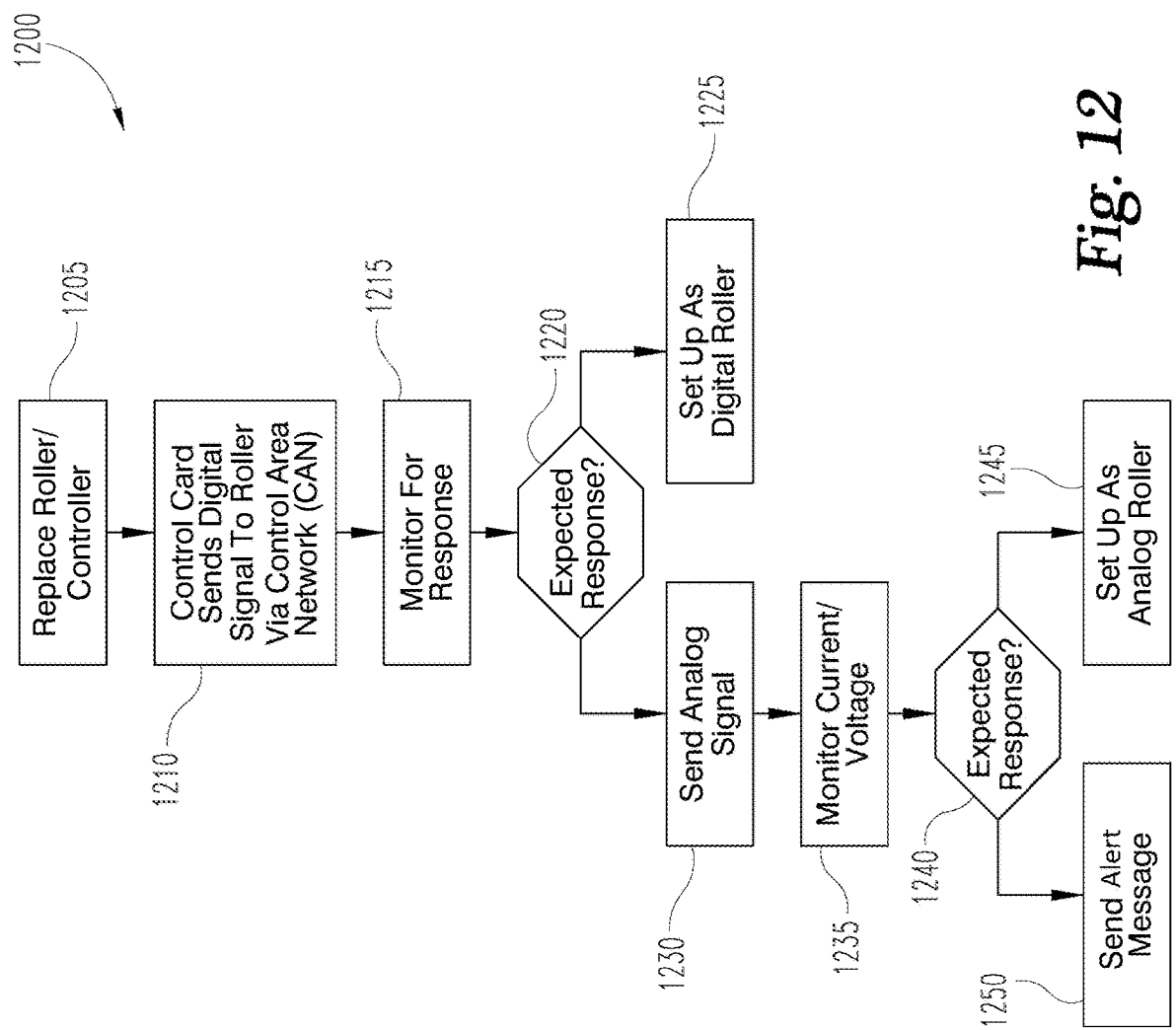
FIG. 12 is a flowchart of a flowchart depicting a technique for determining whether the motorized drive roller is an analog or digital type motorized drive roller.
Figure 13:
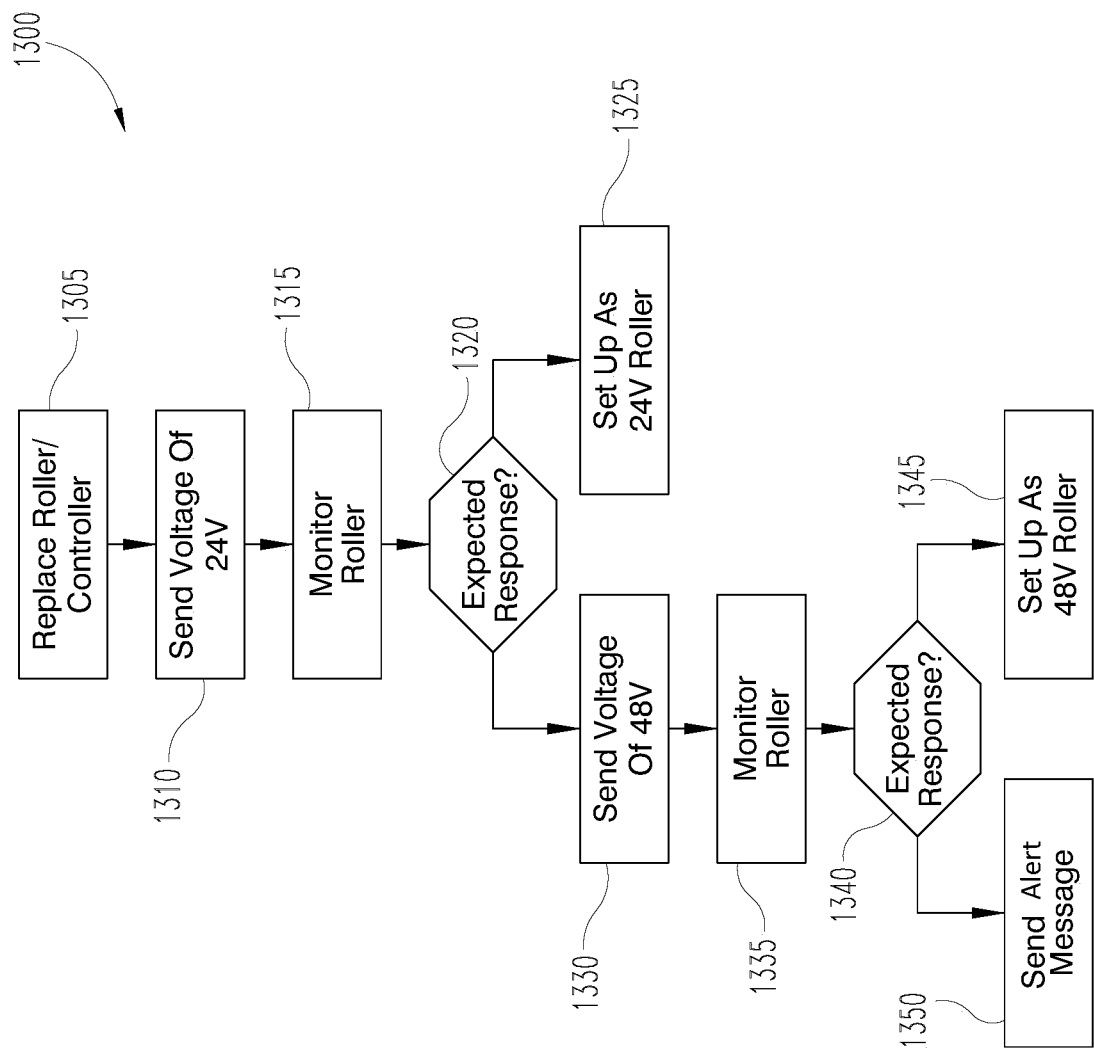
FIG. 13 is a flowchart of a flowchart illustrating technique for determining a voltage rating of the motorized drive roller.

A technique for detecting the type of replacement roller 1115 will now be described with reference to FIGS. 3, 4, 11, 12, and 13. FIG. 12 illustrates a technique for detecting whether the replacement roller 1115 is a digital or analog type motorized drive roller 1112, and FIG. 13 shows a technique for detecting the voltage supply type of the motorized drive roller 1112. While these techniques are illustrated separately in FIGS. 12 and 13 for clarity purposes, the controller card 120 typically performs both of the checks simultaneously or near simultaneously. These techniques can be likewise used when the controller card 120 is replaced with a different one.

FIG. 12 includes a flowchart 1200 that depicts a technique for determining whether the motorized drive roller 1112 is an analog or digital type motorized drive roller 1112. While the technique will be described with reference to replacing the motorized drive roller 1112, it should be recognized that the same technique can be used when the controller card 120 is replaced. At stage 1205, the failed roller 1110 is replaced by the replacement roller 1115 (FIG. 11). During replacement, depending on the type, the replacement roller 1115 is connected to the controller card 120 through the second carrier network 431 or direct conveyor connection 442 (FIG. 4). Referring again to FIG. 3, when needed, the motorized drive roller 1112 is connected to one of the conveyor power connectors 320 of the controller card 120 so that electrical power is supplied to power the motorized drive roller 1112. At stage 1210, the controller card 120 attempts to communicate with the replacement roller 1115 by sending a digital signal via the second network carrier transceiver 430 and second carrier network 431 to the replacement roller 1115. The digital signal in one example is a ping or request for the replacement roller 1115 to respond or reply back to the controller card 120. Alternatively or additionally, the digital signal may be a command to rotate a predetermined amount forward, rotate a predetermined amount backwards, accelerate, stop, and/or any other roller type command.

At stage 1215, the controller card 120 monitors the response from the replacement roller 1115. If the replacement roller 1115 responds as expected in stage 1220, then the controller card 120 will continue to send commands digitally using the second network carrier transceiver 430 in stage 1225. The appropriate response can come in many forms. For example, as noted above, the response can be a simple response from the replacement roller 1115 received by the second network carrier transceiver 430 from the second carrier network 431. The response can also include some direct or indirect measure indicative of movement or operation of the replacement roller 1115. For instance, the controller card 120 via the current sensor 322 can determine whether the replacement roller 1115 drew the proper current from the conveyor power connector 320 which would be indicative of proper movement (e.g., velocity or acceleration) or some other operational parameter in response to a digital signal instructing the motorized drive roller 1112 to move. In one form, the controller card 120 monitors the electrical power line to (or from) the motorized drive roller 1112. If the controller card 120 senses electrical power being drawn, such as via a current or voltage spike on the power line or the current sensor 322, that is indicative the motorized drive roller 1112 being properly responsive to the control signal, the controller card 120 determines the motorized drive roller 1112 is controlled via the digital or network signal. In other variations, the controller card 120 determines movement or responsiveness of the motorized drive roller 1112 by measuring the current (or voltage) on the ground line for the motorized drive roller 1112. The response may also be monitored by one or more photoeyes 250 to confirm proper movement of the packages 240 or other operations. Once more, when the requested action and actual responses match, the controller card 120 identifies the replacement roller 1115 as a digital roller in stage 1225. From this point on, the replacement roller 1115 is controlled via digital signals via second network carrier transceiver 430 of the controller card 120.

If the actual and expected responses is not proper (or nonexistent) in stage 1220, the motor control unit 415 (FIG. 4) of the controller card 120 sends an analog signal to the replacement roller 1115 via the direct conveyor connection 442 in stage 1230, and the controller card 120 again monitors the replacement roller 1115 for the expected response in stage 1235. The analog signal may be a voltage increase, current change, and/or other analog type signal along the direct conveyor connection 442 that is used to power the motorized drive roller 1112. In one example, the analog signal is a ramp up in voltage to no more than 5 V to prevent damage to the motorized drive roller 1112. In response to the analog signal the controller card 120 monitors for an expected change in the replacement roller 1115 at stage 1235. If the expected response matches the actual response at stage 1240, the replacement roller 1115 is set up as an analog roller at stage 1245. From this point on, the replacement roller 1115 is controlled via analog signals from the controller card 120 via the direct conveyor connection 442. If the expected response and the actual response do not match, an alert message is sent to a user or other corrective action is taken in stage 1250 indicating that the replacement roller 1115 may be faulty, improperly installed, or broken. In another example, the alert message may indicate that the controller card 120 is the terminal controller card 120 and thus there is no connection to the replacement roller 1115. In one particular example, the controller card 120 may adjust the voltage to power the motorized drive roller 1112 by some predetermined amount or threshold in stage 1230 thus causing the motorized drive roller 1112 to move in a known fashion in order to determine the power voltage rating for the replacement roller 1115. If the expected motion of the motorized drive roller 1112 is detected in stage 1240, the controller card 120 will continue to send instructions and commands via the direct conveyor connection 442 instead of the second carrier network 431, and the controller card 120 is determined to be connected to an analog roller 208.

It should be recognized that the movement or responsiveness of the motorized drive roller 1112 can be detected in other manners. For example, photoeyes 250 and/or proximity sensors can be used to directly sense movement of the motorized drive roller 1112 or indirectly sense movement by monitoring the location of an object, such as a package 240, moved by the conveyor section 1105 powered by the motorized drive roller 1112. In still yet another variation, a vision system can be used for monitoring the response of the motorized drive roller. However, it should be appreciated that by monitoring the electrical properties of the motorized drive roller eliminates the need for these external sensors which can reduce the overall implementation cost.

In a similar fashion, the controller card 120 is able to determine if the replacement motorized drive roller 1112 is a 24V or 48V type roller by applying the appropriate signal from the controller card 120 and monitoring for a response such as movement based on electrical changes on the power or ground line for the 1112. To minimize the risk for damage, lower voltages are used. For instance, 5V threshold is used when determining whether a 24V or 48V motorized drive roller is being used. Once determined, the controller card 120 will control the motorized drive roller 1112 using the determined analog signal and/or voltage rating.

A flowchart 1300 in FIG. 13 illustrates one example technique for determining the voltage rating of the motorized drive roller 1112. While the technique will be described with reference to replacing the motorized drive roller 1112, it should be recognized that the same technique can be used when the controller card 120 is replaced. At stage 1305, the failed roller 1110 is replaced with the replacement roller 1115 in a similar fashion as described above with respect to stage 1205 in the FIG. 12. At stage 1310 the controller card 120 sends a predetermined voltage to the 24V input or pin of the replacement roller 1115. By first assuming the replacement roller 1115 is a 24V motorized drive roller 1112, reduces the risk of damaging the motorized drive roller 1112 by applying too much voltage. For example, the voltage may be applied at 5V increments to prevent damage to the replacement roller 1115. At stage 1315 the controller card 120 monitors the replacement roller 1115 for a response in a similar fashion as described above for FIG. 12. For example, the controller card 120 monitors the ground line for electrical changes. Alternatively or additionally, the controller card 120 may monitor the replacement roller 1115 itself for electrical changes within the replacement roller 1115. At stage 1320, if the actual response matches the expected response the replacement roller 1115 is determined to be a 24V roller in stage 1325. If the actual response and the expected response do not match in stage 1320, the controller card 120 sends a test voltage to a 48V pin of the replacement roller 1115 in stage 1330. At stage 1335, the controller card 120 monitors the replacement roller 1115 for an appropriate response. For instance, the controller card 120 monitors for power being drawn by monitoring the ground line of the replacement roller 1115. Again, other types of responses, such as those discussed above with respect to FIG. 12, can be monitored. At stage 1340, if the actual response matches the expected response the roller is determined to be a 48V roller at stage 1345. If the expected response and the actual response do not match the controller card 120 sends an alert message to a user in stage 1350 or performs other corrective actions (e.g., shuts down power to the replacement roller 1115). In another example, the alert message may indicate that the controller card 120 is the terminal controller card 120 and thus there is no connection to the replacement roller 1115.

It should be appreciated that the processes for determining the type of a replacement roller 1115 illustrated in FIGS. 12 and 13 is performed each time the conveyor 205 starts up. Performing the roller detection process each start up prevents damage to equipment by verifying the rollers 208 type at each start up.

Figure 14:
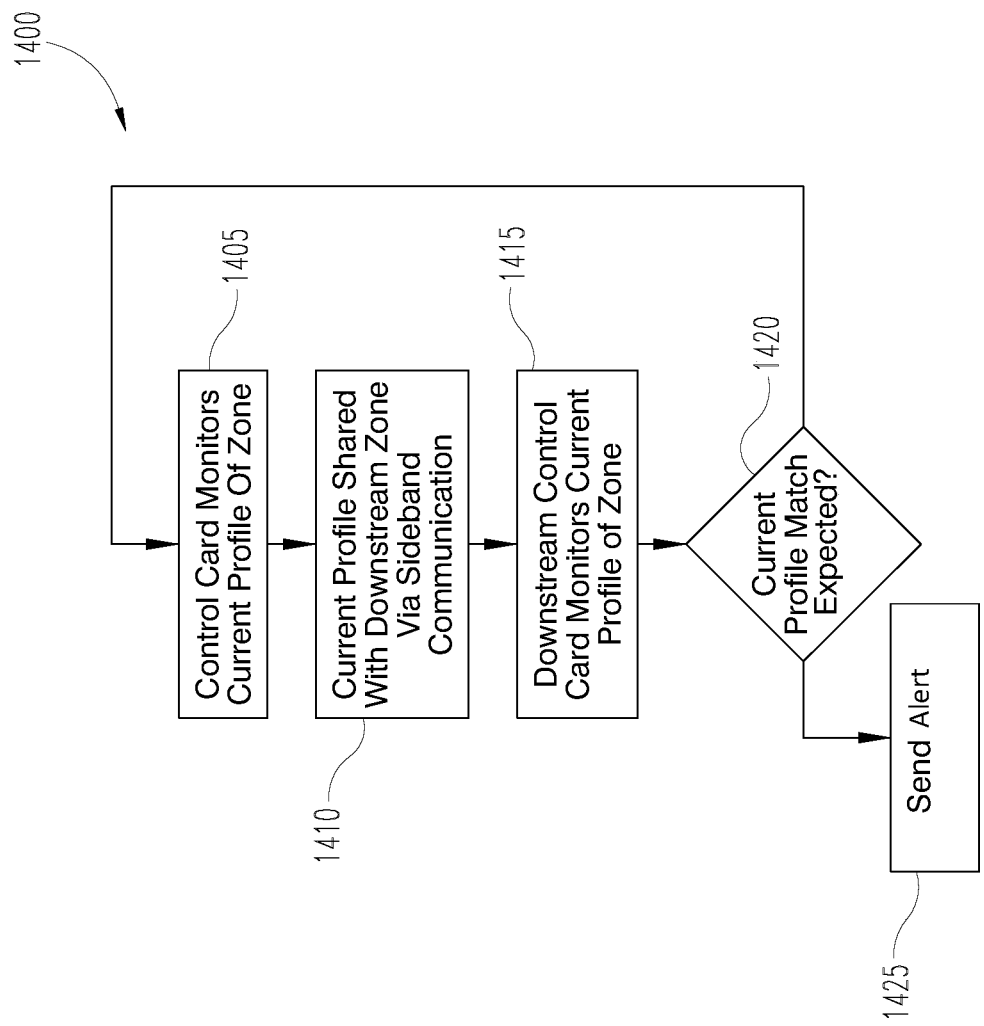
FIG. 14 is a flowchart of a flowchart showing a technique for monitoring the location of packages without additional sensors.

The conveyor system 100 is further configured to facilitate tracking of packages 240 on the conveyors 205 without the need for extraneous sensors like photoeyes. A technique for monitoring the location of the packages 240 without additional sensors will now be generally described with reference to FIGS. 1, 2, 3, 4, and 14. A flowchart 1400 illustrating this technique is shown in FIG. 14. The technique will be described with reference to the controller cards 120 primarily performing the various acts described, but it should be recognized that some of the other components of the conveyor system 100, such as the warehouse management system 105 and programmable logic controllers 110, can perform these actions either alone or in combination with the other components.

Referring to FIG. 14, the controller card 120 at stage 1405 monitors an electric profile of the conveyor zone 115. For example, the controller card 120 in one variation monitors a current profile for the motorized drive rollers 1112 in particular conveyor zones 115. When an item, such as a package 240, cart, tote, etc., is actively moved by the motorized drive roller 1112 more electric power is typically drawn as compared to when nothing is moved. In one form, the controller card 120 monitors the current drawn by the motorized drive rollers 1112 through the current sensors 322 (FIG. 3). When an item leaves the conveyor zone 115, there is usually a spike in current (or voltage) for the motorized drive roller 1112 which is indicative that the package 240 is no longer present in that conveyor zone 115. The size of the current spike is indicative of the weight of the item moved in the conveyor zone 115, and the duration of the particular current profile or the duration between successive current spikes is used by the controller card 120 to determine the length of the item. Based on the length and/or size of the item as determined by the current profile, the controller card 120 is able to adequately space the items so as to eliminate or minimize contact between adjacent items on the conveyor without the need for package sensors such as photoeyes. In other variations, the conveyor system 100 includes some sensors for other monitoring purposes or to serve as a backup for confirmation purposes. In one example, the sensors are photoeyes 250 such as those illustrated in FIG. 2. In one case, the photoeye 250 at the start of the conveyor zone 115 confirms the package 240 entering the particular conveyor zone 115, and the package 240 is tracked or monitored through the rest of the conveyor zone 115 via the power drawn by the motorized drive rollers 1112.

When the package 240 leaves a given conveyor zone 115, the controller card 120 via the downstream port 410 and the sideband communication channel 245 (and/or main communication channel 242) notifies the downstream controller card 120 of the package 240 entering the downstream conveyor zone 115. In one example, an identifier (or SKU) for the package is transmitted via the sideband communication channel 245 from the upstream controller card 120 to the downstream controller card 120. Alternatively or additionally, other information about the package 240, such as the size and the weight of the packages 240 or current profile, can be transmitted to the downstream controller card 120. In one form, the upstream controller card 120 at stage 1410 communicates the current profile for the transferred package 240 to the controller card 120 in the downstream zone via the sideband communication channel 245. The downstream controller card 120 monitors the current profile of the downstream zone at stage 1415. The downstream controller card 120 is able to use the information from the upstream conveyor zone 115 to compare the current profile of the downstream conveyor zone 115 with the expected current profile of the upstream conveyor zone 115 at stage 1420. If the current profiles match no action is taken. However, if the current profiles are different an alert is sent to a user at stage 1425. The alert message may indicate that a package 240 is missing and/or there is a conveyor jam based on difference between the actual and expected current profiles. In another example, the alert may indicate that the controller card 120 is the last controller card 120 in the chain. With this technique, the controller cards 120 can transmit package tracking information to the warehouse management system 105 and/or the programmable logic controllers 110 for further processing and reporting purposes.

As should be recognized, when the packages 240 press against one another, such as in conventional systems, the packages 240 can be damaged. With this technique, the packages 240 can be spaced apart on the conveyors 205 without the need for the expense and complications created by extra sensors needed for tracking the packages 240. Thus, there is no or zero-pressure between the packages 240 with the conveyor system 100. As should be appreciated, this zero pressure zone communication technique enables the conveyor system 100 to perform photoeye-less zone-to-zone tracking of packages 240.

During operation, parts of the conveyors 205 may break or need repair such that the conveyor 205 needs to be stopped. Using routine lockout/tagout procedures, power to the conveyor 205 typically is cut off so as to prevent potential injury. However, when the power is cut off to the entire conveyor 205, power to the conveyor controllers is also typically cut off. With the controller unpowered, diagnostics and restarting of the conveyor system can become quite difficult.

Figure 15:
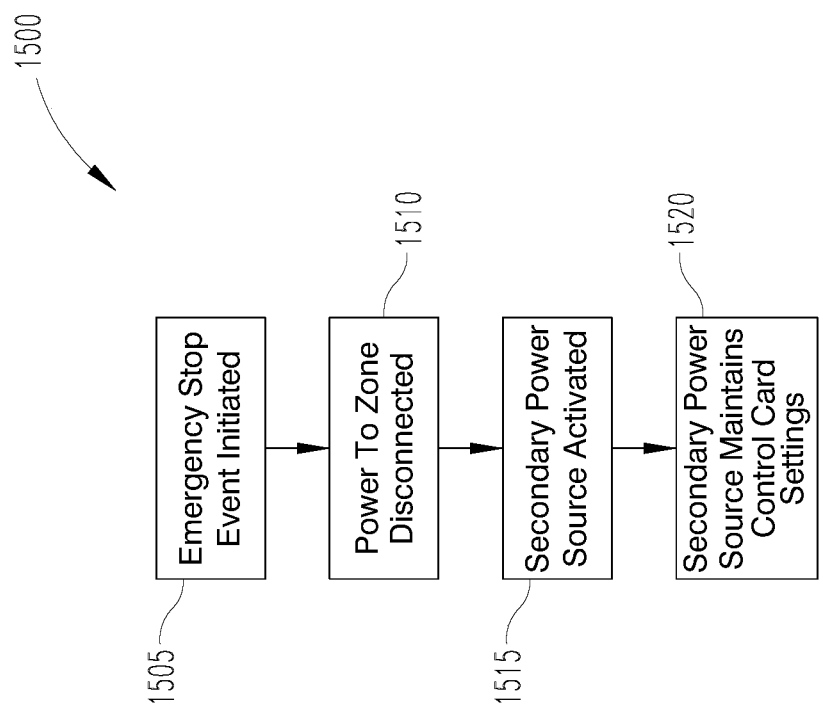
FIG. 15 is a flowchart of a flowchart depicting an emergency stop technique.

An emergency stop technique that cuts power off to components of the conveyor 205 that may cause injury but allows a quick restart will now be described with reference to FIGS. 3, 4, and 15. FIG. 15 shows a flowchart 1500 for this technique. At stage 1505, an emergency stop event is initiated. The emergency stop event may be initiated automatically by the controller card 120 or manually by a user (e.g., by pressing a stop button). At stage 1510, the controller card 120 shuts off power to parts of the conveyor zone 115 that may cause injury such as moving parts (e.g. roller 208, solenoids, etc.). For example, the controller card 120 in one example shuts the power off to all of the motorized drive rollers 1112 in the particular conveyor zone 115. As can be seen in FIG. 3, the power source for roller movement of the conveyor zone 115 is separate from the power source that powers the controller card 120. The controller card 120 in one variation opens the switches 310 to cut off power supplied to the motorized drive rollers 1112 via the conveyor power connectors 320. At the same time, power is still supplied to the motor control unit 415 as well as other components of the controller card 120. In stage 1515, this secondary power source for the logic or control components of the controller card 120 remains active and prevents the controller card 120 from resetting. Consequently, the controller card 120 is able to remain active. It should be noted that the power supplied to the controller card 120 is of very little voltage and poses no significant risk of harm. With the controller card 120 being still powered, the controller card 120 can be used to diagnose and troubleshoot issues. At stage 1520, the secondary power source continues to maintain power to the controller card 120 until the emergency stop event is completed and operation of the conveyor zone 115 can proceed as normal. At that point, the controller card 120 can reenergize the motorized drive rollers 1112 and other potentially dangerous equipment so that normal conveyor activities can resume.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"About" with reference to numerical values generally refers to plus or minus 10% of the stated value. For example if the stated value is 4.375, then use of the term "about 4.375" generally means a range between 3.9375 and 4.8125.

"And/Or" generally refers to a grammatical conjunction indicating that one or more of the cases it connects may occur. For instance, it can indicate that either or both of two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Communication Link" or "Communication Channel" generally refers to a connection between two or more communicating entities and may or may not include a communications channel between the communicating entities. The communication between the communicating entities may occur by any suitable means. For example, the connection may be implemented as an actual physical link, an electrical link, an electromagnetic link, a logical link, or any other suitable linkage facilitating communication. In the case of an actual physical link, communication may occur by multiple components in the communication link configured to respond to one another by physical movement of one element in relation to another. In the case of an electrical link, the communication link may be composed of multiple electrical conductors electrically connected to form the communication link. In the case of an electromagnetic link, elements of the connection may be implemented by sending or receiving electromagnetic energy at any suitable frequency, thus allowing communications to pass as electromagnetic waves. These electromagnetic waves may or may not pass through a physical medium such as an optical fiber, or through free space, or any combination thereof. Electromagnetic waves may be passed at any suitable frequency including any frequency in the electromagnetic spectrum. In the case of a logical link, the communication links may be a conceptual linkage between the sender and recipient such as a transmission station in the receiving station. Logical link may include any combination of physical, electrical, electromagnetic, or other types of communication links.

"Communication Node" generally refers to a physical or logical connection point, redistribution point or endpoint along a communication link. A physical network node is generally referred to as an active electronic device attached or coupled to a communication link, either physically, logically, or electromagnetically. A physical node is capable of sending, receiving, or forwarding information over a communication link. A communication node may or may not include a computer, processor, transmitter, receiver, repeater, and/or transmission lines, or any combination thereof.

"Computer" generally refers to any computing device configured to compute a result from any number of input values or variables. A computer may include a processor for performing calculations to process input or output. A computer may include a memory for storing values to be processed by the processor, or for storing the results of previous processing. A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. A computer may include one or more physical processors or other computing devices or circuitry, and may also include any suitable type of memory. A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer. The concept of "computer" and "processor" within a computer or computing device also encompasses any such processor or computing device serving to make calculations or comparisons as part of a disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

"Controller" generally refers to a device, using mechanical, hydraulic, pneumatic electronic techniques, and/or a microprocessor or computer, which monitors and physically alters the operating conditions of a given dynamical system. In one non-limiting example, the controller can include an Allen Bradley brand Programmable Logic Controller (PLC). A controller may include a processor for performing calculations to process input or output. A controller may include a memory for storing values to be processed by the processor, or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller. A controller may be a single, physical, computing device such as a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus, a controller may include one or more physical processors or other computing devices or circuitry, and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Conveyor" is used in a broad sense to generally refer to a mechanism that is used to transport something, like an item, box, container, and/or SKU. By way of non-limiting examples, the conveyor can include belt conveyors, wire mesh conveyors, chain conveyors, electric track conveyors, roller conveyors, cross-belt conveyors, vibrating conveyors, and skate wheel conveyors, to name just a few. The conveyor all or in part can be powered or unpowered. For instance, sections of the conveyors can include gravity feed sections.

"Conveyor Zone" or "Zone" generally refers to a section of a conveyor. For example, a conveyor zone includes a section of conveyor driven by a single motorized drive roller (MDR) and/or other types of conveyor motors.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour. Data may be organized and represented in a structured format. Examples include a tabular representation using rows and columns, a tree representation with a set of nodes considered to have a parent-children relationship, or a graph representation as a set of connected nodes to name a few. The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Fastener" generally refers to a hardware device that mechanically joins or otherwise affixes two or more objects together. By way of non-limiting examples, the fastener can include bolts, dowels, nails, nuts, pegs, pins, rivets, screws, buttons, hook and loop fasteners, and snap fasteners, to just name a few.

"Frame" generally refers to the structure which supports the mechanical components of a conveyor and/or sorter that are configured to move items.

"Main Communication Channel" or "Main Communication Link" generally refers to a physical medium (e.g., wires or cables) and/or intangible constructs (e.g., frequencies, addresses, etc.) where normal network communications occur.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). Memory can also refer to non-volatile storage technologies such as non-volatile read access memory (NVRAM), flash memory, non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Microcontroller" or "MCU" generally refers to a small computer on a single integrated circuit. It may be similar to, but less sophisticated than, a System on a Chip or "SoC"; an SoC may include a microcontroller as one of its components. A microcontroller may contain one or more CPUs (processor cores) along with memory and programmable input/output peripherals. Program memory in the form of ferroelectric RAM, NOR flash or OTP ROM may also be included on the chip, as well as a small amount of RAM. Microcontrollers may be designed for embedded applications, in contrast to the microprocessors used in personal computers or other general purpose applications consisting of various discrete chips. Microcontrollers may be included in automatically controlled products and devices, such as automobile engine control systems, implantable medical devices, remote controls, office machines, appliances, power tools, toys and other embedded systems. An MCU may be configured to handle mixed signals thus integrating analog components needed to control non-digital electronic systems. Some microcontrollers may use four-bit words and operate at frequencies as low as 4 kHz, for low power consumption (single-digit milliwatts or microwatts). They will generally have the ability to retain functionality while waiting for an event such as a button press or other interrupt; power consumption while sleeping (CPU clock and most peripherals off) may be just nanowatts, making many of them well suited for long lasting battery applications. Other microcontrollers may serve performance roles, where they may need to act more like a Digital Signal Processor (DSP), with higher clock speeds and power consumption. A microcontroller may include any suitable combination of circuits such as: 1. a central processing unit—ranging from small and simple processors with registers as small as 4 bits or list, to complex processors with registers that are 32, 64, or more bits 2. volatile memory (RAM) for data storage 3. ROM, EPROM, EEPROM or Flash memory for program and operating parameter storage 4. discrete input and output bits, allowing control or detection of the logic state of an individual package pin 5. serial input/output such as serial ports (UARTs) 6. other serial communications interfaces like I$^2$C, Serial Peripheral Interface and Controller Area Network for system interconnect 7. peripherals such as timers, event counters, PWM generators, and watchdog 8. clock generator—often an oscillator for a quartz timing crystal, resonator or RC circuit 9. many include analog-to-digital converters, some include digital-to-analog converters 10. in-circuit programming and in-circuit debugging support.

"Motorized Drive Roller" or "MDR" generally refers to a powered conveyor roller with an internally mounted motor that is configured to rotate or spin the roller. The MDR may be controlled via internal and/or external commutation. In one form, the motor for the MDR includes an electric DC motor.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices. Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other. Examples of wired network connections may include Digital Subscriber Lines (DSL), coaxial cable lines, or optical fiber lines. The wireless connections may include BLUETOOTH®, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11(b), 802.11(g), or 802.11(n) to name a few). Wireless links may also include or use any cellular network standards used to communicate among mobile devices including 1G, 2G, 3G, 4G, or 5G. The network standards may qualify as 1G, 2G, etc. by fulfilling a specification or standards such as the specifications maintained by the International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced. Cellular network standards may use various channel access methods such as FDMA, TDMA, CDMA, or SDMA. Different types of data may be transmitted via different links and standards, or the same types of data may be transmitted via different links and standards. The geographical scope of the network may vary widely. Examples include a Body Area Network (BAN), a Personal Area Network (PAN), a Local-Area Network (LAN), a Metropolitan Area Network (MAN), a Wide Area Network (WAN), or the Internet. A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

"Optionally" means discretionary; not required; possible, but not compulsory; left to personal choice.

"Photoeye", "PE", or "Photoelectric Sensor" generally refers to a device configured to detect the presence, absence, and/or distance of an object with a light transmitter (or emitter) and a photoelectric receiver. In one form, the emitter and receiver are integrated to form a single unit, and in another form, the emitter and receiver are separate components. Photoeyes can be generally categorized into three different types, opposed (through-beam), retro-reflective, and proximity-sensing (diffused) types.

"Predominately" is synonymous with greater than 50%.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement. The concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well. The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Roller" generally refers to a cylindrically shaped material handling component that is able to revolve. Typically, but not always, the roller is configured to provide mechanical power transmission, a conveying surface, and/or support for conveyed objects or items. The roller can be powered or unpowered.

"Sideband Communication" generally refers to a communication protocol or technique where normal network communications are transmitted as well as other services are provided via a main communication channel and where a separate communication channel (or sideband channel) is used to facilitate separate peer to peer communications. The sideband communication can occur in wired and/or wireless networks. For example, in a wired Ethernet network environment, normal controller area network communications can occur in the standard wires that form the main communication channel used for normal network communication and the sideband communication channel can exist on the unused wires for the main Ethernet communication protocol. For instance, the sideband communications can occur using a serial RJ485 standard. In wireless networks, the main communication channel is typically associated with a carrier frequency, and the sideband communications can occur on the lower sideband (USB) or the upper sideband (USB) lobe frequencies around the carrier frequency. In other examples where the wireless communication is digital, different addresses or other signifiers can be used to delineate the main and sideband communication channels.

"Sideband Communication Channel" or "Sideband Communication Link" generally refers to a physical medium (e.g., wires or cables) and/or intangible constructs (e.g., frequencies, addresses, etc.) where communications outside normal network communications occur. The sideband communication channel is separate and distinct from the main communication channel on a given network such that communications on the sideband communication channel have no impact on communications on the main communication channel.

"Stock Keeping Unit" (SKU) or "Item" generally refers to an individual article or thing. The SKU can come in any form and can be packaged or unpackaged. For instance, SKUs can be packaged in cases, cartons, bags, drums, containers, bottles, cans, pallets, and/or sacks, to name just a few examples. The SKU is not limited to a particular state of matter such that the item can normally have a solid, liquid, and/or gaseous form for example.

"Storage Container" generally refers to an object that can be used to hold or transport SKUs or other objects. By way of non-limiting examples, the storage container can include cartons, totes, pallets, bags, and/or boxes.

"Storage Facility" generally refers to a location for keeping and/or storing items or goods. A storage facility may keep the items or goods indoors or outdoors. As an example, a storage facility may be a large building, such as a warehouse, or may be an outdoor area that is either open or enclosed by a fence or by another suitable method.

"Substantially" generally refers to the degree by which a quantitative representation may vary from a stated reference without resulting in an essential change of the basic function of the subject matter at issue. The term "substantially" is utilized herein to represent the inherent degree of uncertainty that may be attributed to any quantitative comparison, value, measurement, and/or other representation.

"Transceiver" generally refers to a device that includes both a transmitter and a receiver that share common circuitry and/or a single housing. Transceivers are typically, but not always, designed to transmit and receive electronic signals, such as analog and/or digital radio signals.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS 100 conveyor system
105 warehouse management system
110 programmable logic controllers
115 conveyor zone
120 controller card
125 communication cable
130 chain master
200 conveyor system
205 conveyor
206 frame
207 rails
208 rollers
210 first zone
215 second zone
220 third zone
225 first controller card
230 second controller card
235 third controller card
240 packages
242 main communication channel
245 sideband communication channel
250 photoeye
300 power system
305 bus power
310 switch
320 conveyor power connector
322 current sensor
325 regulator
330 photoeye
335 light emitting diode
340 brake
345 chopper
350 logic power
355 power path selector
400 communication system
405 upstream port
410 downstream port
415 motor control unit
420 first network carrier transceiver
425 upstream sideband transceiver
427 downstream sideband transceiver
428 first carrier network connection
429 sideband connections
430 second network carrier transceiver
431 second carrier network
432 motor control unit carrier link
433 motor control unit sideband link
435 first electrical device
440 second electrical device
442 direct conveyor connection
445 termination resistor
450 CAN gateway
500 sideband communication system
510 first controller card
520 second controller card
605 channel
610 access panel
705 groove
710 track
805 circuit board
810 upstream port
815 downstream port
905 main board
910 secondary board
1005 fastener
1100 conveyor maintenance area
1105 conveyor section
1110 failed roller
1112 motorized drive roller
1115 replacement roller
1120 24V roller
1125 48V roller
1130 analog roller
1135 digital roller
1200 flowchart
1205 stage
1210 stage
1215 stage
1220 stage
1225 stage
1230 stage
1235 stage
1240 stage
1245 stage
1250 stage
1300 flowchart
1305 stage
1310 stage
1315 stage
1320 stage
1325 stage
1330 stage
1335 stage
1340 stage
1345 stage
1350 stage
1400 flowchart
1405 stage
1410 stage
1415 stage
1420 stage
1425 stage
1500 flowchart
1505 stage
1510 stage
1515 stage
1520 stage

What is claimed is:

1. A conveyor system, comprising:
   a controller card;
   a motorized drive roller;
   wherein the motorized drive roller is operatively connected to the controller card; and
   wherein the controller card is configured to determine a type of the motorized drive roller.

2. The conveyor system of claim 1, wherein the controller card is configured to determine whether the motorized drive roller is an analog or digital type motorized drive roller.

3. The conveyor system of claim 1, wherein the controller card is configured to determine whether the motorized drive roller is a 24V or 48V type motorized drive roller.

4. The conveyor system of claim 1, wherein the controller card is configured to orient items on a conveyor in a zero pressure configuration without information from external sensors.

5. The conveyor system of claim 1, wherein:
   the controller card includes a primary power source configured to power the motorized drive roller;
   the controller card includes a secondary power source to retain settings of the controller card; and
   the controller card has a switch to disconnect the primary power source while retaining power on the secondary power source.

6. The conveyor system of claim 1, wherein the controller card is configured to determine the type based on a response of the motorized drive roller to a signal sent to the motorized drive roller.

7. The conveyor system of claim 6, wherein the signal is a digital signal.

8. The conveyor system of claim 7, further comprising:
   a controller area network (CAN) operatively connecting the controller card to the motorized drive roller; and
   wherein the controller card is configured to send the digital signal over the CAN.

9. The conveyor system of claim 6, wherein:
   the signal is an analog signal; and
   the controller card is configured to send the analog signal to the motorized drive roller.

10. The conveyor system of claim 9, wherein the analog signal is a ramp up in voltage up to at most 5 volts.

11. The conveyor system of claim 6, wherein the signal is a first signal.

12. The conveyor system of claim 6, wherein the response includes movement of the motorized drive roller.

13. The conveyor system of claim 6, wherein the response includes a change in an electrical property of the motorized drive roller.

14. The conveyor system of claim 13, wherein the electrical property includes current drawn by the motorized drive roller.

15. A conveyor system, comprising:
   a controller card;
   a motorized drive roller;
   wherein the motorized drive roller is operatively connected to the controller card; and
   wherein the controller card is configured to orient items on a conveyor in a zero pressure configuration without information from external sensors.

16. The conveyor system of claim 15, wherein:
   the controller card includes a primary power source configured to power the motorized drive roller;
   the controller card includes a secondary power source to retain settings of the controller card; and
   the controller card has a switch to disconnect the primary power source while retaining power on the secondary power source.

17. The conveyor system of claim 15, wherein the controller card is configured to determine a type of the motorized drive roller.

18. The conveyor system of claim 17, wherein the controller card is configured to determine whether the motorized drive roller is an analog or digital type motorized drive roller.

19. The conveyor system of claim 17, wherein the controller card is configured to determine whether the motorized drive roller is a 24V or 48V type motorized drive roller.

20. The conveyor system of claim 15, wherein the controller card is configured to sense position of the items based on an electrical profile of a motorized drive roller.

21. The conveyor system of claim 20, wherein the electrical profile is indicative of item weight.

22. The conveyor system of claim 20, wherein the electrical profile includes a current spike.

23. The conveyor system of claim 22, wherein:
   the electrical profile includes duration of the current spike; and
   the duration of the current spike is indicative of item length.

24. A conveyor system, comprising:
   a controller card;
   a motorized drive roller;
   a motorized drive roller is operatively connected to the controller card;
   wherein the controller card includes a primary power source configured to power the motorized drive roller;
   wherein the controller card includes a secondary power source to retain settings of the controller card; and
   wherein the controller card has a switch to disconnect the primary power source while retaining power on the secondary power source.

25. The conveyor system of claim 24, wherein the controller card is configured to determine a type of the motorized drive roller.

26. The conveyor system of claim 25, wherein the controller card is configured to determine whether the motorized drive roller is an analog or digital type motorized drive roller.

27. The conveyor system of claim 25, wherein the controller card is configured to determine whether the motorized drive roller is a 24V or 48V type motorized drive roller.

28. The conveyor system of claim 25, wherein the controller card is configured to orient items on a conveyor in a zero pressure configuration without information from external sensors.

29. The conveyor system of claim 28, wherein the controller card is configured to sense position of the items based on an electrical profile of a motorized drive roller.

* * * * *